United States Patent
Qian et al.

(10) Patent No.: US 12,552,789 B2
(45) Date of Patent: Feb. 17, 2026

(54) 1H-PYRROLO[2,3-C]PYRIDINE COMPOUNDS AND APPLICATION THEREOF

(71) Applicant: JUMBO DRUG BANK CO., LTD., Sichuan (CN)

(72) Inventors: Wenyuan Qian, Shanghai (CN); Xiawei Wei, Sichuan (CN); Chundao Yang, Shanghai (CN); Guanghai Xu, Shanghai (CN); Ning Jiang, Sichuan (CN); Shuhui Chen, Shanghai (CN)

(73) Assignee: JUMBO DRUG BANK CO., LTD., Sichuan (CN)

( * ) Notice: Subject to any disclaimer, the term of this patent is extended or adjusted under 35 U.S.C. 154(b) by 510 days.

(21) Appl. No.: 18/246,247

(22) PCT Filed: Sep. 24, 2021

(86) PCT No.: PCT/CN2021/120385
§ 371 (c)(1),
(2) Date: Mar. 22, 2023

(87) PCT Pub. No.: WO2022/063241
PCT Pub. Date: Mar. 31, 2022

(65) Prior Publication Data
US 2023/0357241 A1    Nov. 9, 2023

(30) Foreign Application Priority Data

Sep. 25, 2020  (CN) .......................... 202011023186.4
Nov. 11, 2020  (CN) .......................... 202011253763.9

(51) Int. Cl.
C07D 471/04    (2006.01)
A61P 35/00     (2006.01)

(52) U.S. Cl.
CPC ............ *C07D 471/04* (2013.01); *A61P 35/00* (2018.01)

(58) Field of Classification Search
CPC ..... C07D 471/04; A61P 35/00; A61K 31/444; A61K 31/497; A61K 31/506
See application file for complete search history.

(56) References Cited

FOREIGN PATENT DOCUMENTS

| WO | 2016179415 A1 | 11/2016 |
| WO | 2018233526 A1 | 12/2018 |
| WO | 2018233527 A1 | 12/2018 |
| WO | 2019214681 A1 | 11/2019 |

*Primary Examiner* — Savitha M Rao
*Assistant Examiner* — Elena Vladimirovna Vishnyakova
(74) *Attorney, Agent, or Firm* — NKL Law; Allen Xue

(57) ABSTRACT

A series of 1H-pyrrolo[2,3-c]pyridine compounds and an application thereof are provided. The compounds include those represented by formula (P) and a pharmaceutically acceptable salt thereof.

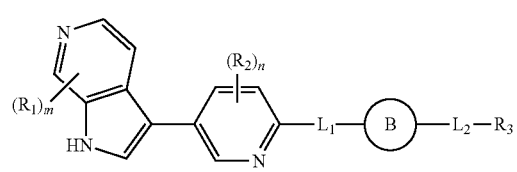

18 Claims, 1 Drawing Sheet

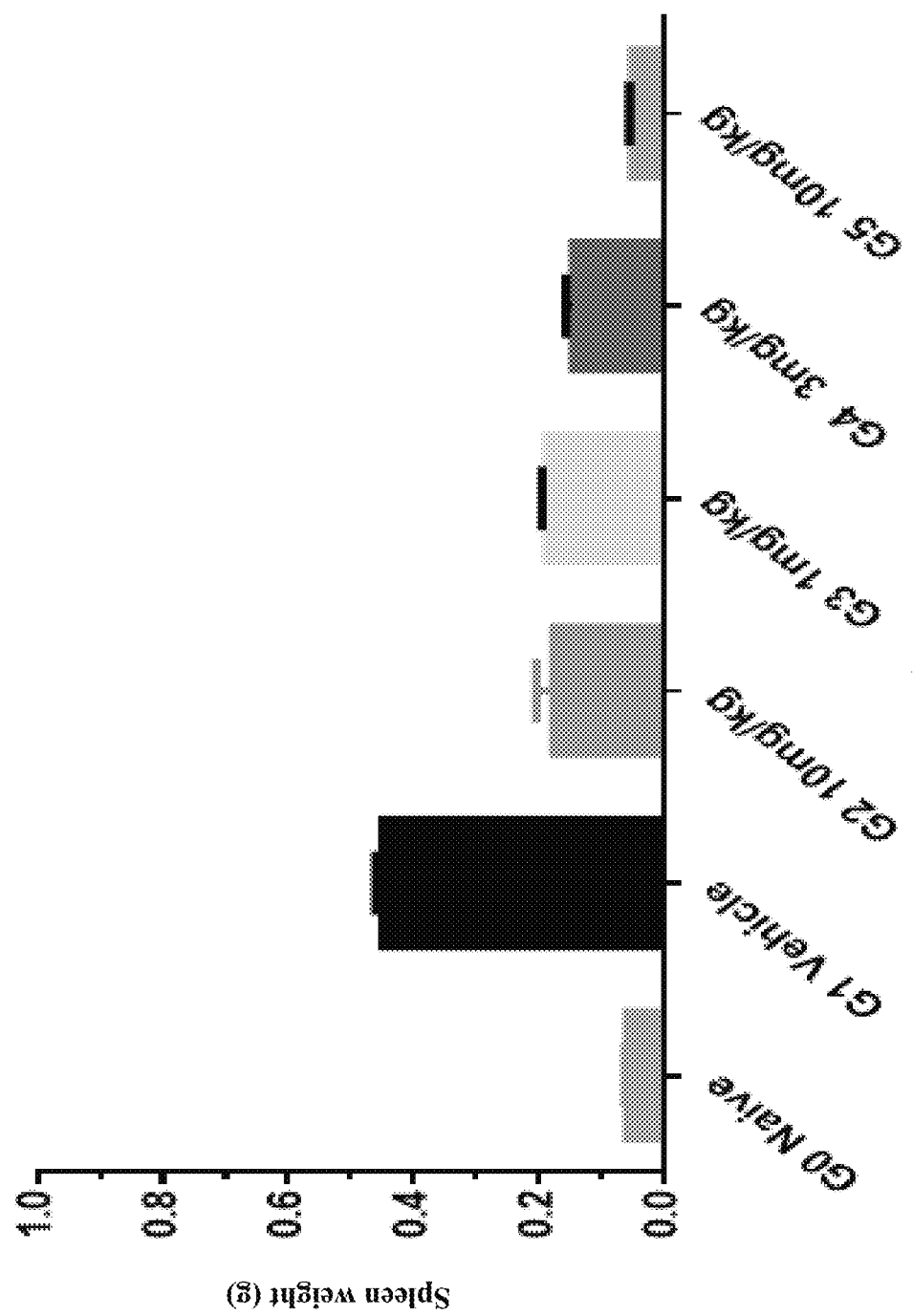

1H-PYRROLO[2,3-C]PYRIDINE COMPOUNDS AND APPLICATION THEREOF

CROSS-REFERENCE TO RELATED APPLICATIONS

This application is a U.S. national stage entry of PCT International Application No. PCT/CN2021/120385, filed on Sep. 24, 2021, which claims the priority of Chinese Patent No. 202011023186.4, filed on Sep. 25, 2020, and No. 202011253763.9, filed on Nov. 11, 2020, the content of which is incorporated herein by reference in its entirety.

TECHNICAL FIELD

The present disclosure relates to a series of 1H-pyrrolo[2,3-c]pyridine compounds and use thereof, in particular to a compound of formula (P) and a pharmaceutically acceptable salt thereof.

BACKGROUND

Colony stimulating factor 1 (CSF-1), also known as macrophage colony stimulating factor (M-CSF), is an important growth factor that controls the growth of bone marrow progenitor cells, monocytes, macrophages, osteoclasts differentiated from macrophages, dendritic cells, and the like. It must bind to its only cell surface receptor CSF-1R to exert its biological effects. CSF-1R is encoded by proto-oncogene c-FMS, so it is also referred to as c-FMS, and is a receptor tyrosine kinase. The binding of CSF-1 to CSF-1R in the extracellular domain induces the dimerization of CSF-1R, which further leads to autophosphorylation of the CSF-1R kinase region within the cell. Once phosphorylation occurs, CSF-1R acts as a docking site for several cytoplasmic signaling molecules, eventually triggering a series of signaling cascade reactions. For example, the phosphorylation of the tyrosine residue at position 697 of CSF-1R can activate the MAPK signaling pathway, while the phosphorylation of its tyrosine residue at position 721 can initiate the PI3K and PLCγ signaling pathways.

Colony stimulating factor-1 receptor (CSF-1R) is a key target for the regulation of tumor-associated macrophages within the tumor microenvironment. Many tumor cells can secrete growth factors like CSF-1 during the growth process, and the growth factors can recruit macrophages (tumor-associated macrophages, TAMs) to enter tumor regions. The macrophages can secrete CSF-1 just like the tumor cells, and their entrance promotes the formation of a complex tumor microenvironment, which can help the tumor cells to generate immune tolerance to autoimmune function, thereby promoting the proliferation, invasion and metastasis of the tumor cells in vivo. It has been shown that blocking the CSF-1/CSF1R pathway can significantly reduce macrophage infiltration at a tumor site, slow down primary tumor growth, and reduce tumor metastasis. Therefore, it has become an important strategy for cancer immunotherapy to inhibit the survival/activation of macrophages by inhibiting the CSF-1/CSF1R signaling.

Recent studies have shown that CSF-1R inhibitors can be used in the field of disease treatment by a variety of routes. It can be used alone, or can also be used in combination with a variety of anti-cancer therapies, such as anti-angiogenesis, adoptive transfer of T cells, radiotherapy, chemotherapy, immune checkpoint therapy, and the like. Many marketed drugs have inhibitory activity on CSF-1R, such as imatinib, dasatinib, sunitinib, and the like, but no selective CSF-1R inhibitor is available on the market. Pexidartinib (PLX-3397), developed by Plexxikon and acquired by Daiichi Sankyo, is a dual inhibitor of CSF-1R and c-Kit, and has been approved by FDA for marketing in August 2019 for the treatment of tenosynovial giant cell tumor (TGCT).

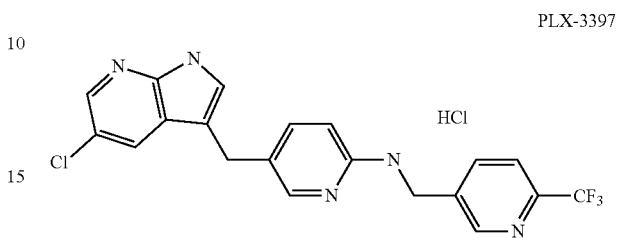

PLX-3397

SUMMARY

The present disclosure provides a compound of formula (P) or a pharmaceutically acceptable salt thereof,

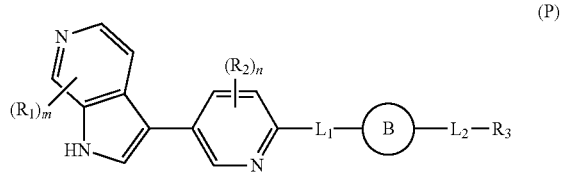

(P)

wherein,
R$_1$ is selected from F, Cl, Br, I, C$_{1-3}$ alkyl, C$_{1-3}$ alkoxy, —C(═O)—C$_{1-3}$ alkyl and —C(═O)—NH—C$_{1-3}$ alkyl, the C$_{1-3}$ alkyl, C$_{1-3}$ alkoxy, —C(═O)—C$_{1-3}$ alkyl and —C(═O)—NH—C$_{1-3}$ alkyl being optionally substituted with 1, 2 or 3 R$_a$;
R$_2$ is selected from F, Cl, Br, I and C$_{1-3}$ alkyl, the C$_{1-3}$ alkyl being optionally substituted with 1, 2 or 3 R$_b$;
R$_3$ is selected from H, C$_{1-3}$ alkyl and C$_{3-5}$ cycloalkyl, the C$_{1-3}$ alkyl and C$_{3-5}$ cycloalkyl being optionally substituted with 1, 2 or 3 R$_c$;
ring B is selected from phenyl and 6-membered heteroaryl;
m and n are each independently selected from 0, 1 and 2;
L$_1$ is selected from —N(R$_d$)—;
L$_2$ is selected from a single bond, —O—, —N(R$_d$)—C(═O)— and —N(R$_d$)—C(R$_e$)(R$_f$)—;
R$_a$, R$_b$ and R$_c$ are each independently selected from F, Cl, Br, I and CH$_3$;
R$_d$, R$_e$ and R$_f$ are each independently selected from H and CH$_3$.

In some embodiments of the present disclosure, the R$_1$ described above is selected from F, Cl, Br, I, CH$_3$, OCH$_3$, —C(═O)—CH$_3$ and —C(═O)—NH—CH$_3$, the CH$_3$, OCH$_3$, —C(═O)—CH$_3$ and —C(═O)—NH—CH$_3$ being optionally substituted with 1, 2 or 3 R$_a$; the other variables are as defined herein.

In some embodiments of the present disclosure, the R$_1$ described above is selected from F, Cl, Br, I, CH$_3$, CHF$_2$, CF$_3$, OCH$_3$, —C(═O)—CH$_3$ and —C(═O)—NH—CH$_3$; the other variables are as defined herein.

In some embodiments of the present disclosure, the R$_2$ described above is selected from F, Cl, Br, I and CH$_3$, the CH₃ being optionally substituted with 1, 2 or 3 R$_b$; the other variables are as defined herein.

In some embodiments of the present disclosure, the R₂ described above is selected from F, Cl, Br, I, CH₃, CH₂F, CHF₂ and CF₃; the other variables are as defined herein.

In some embodiments of the present disclosure, the R₃ described above is selected from H, CH₃, CH(CH₃)₂ and cyclopropyl, the CH₃, OCH₃ and cyclopropyl being optionally substituted with 1, 2 or 3 R$_c$; the other variables are as defined herein.

In some embodiments of the present disclosure, the R₃ described above is selected from H, CH₃, CF₃, CH(CH₃)₂ and cyclopropyl; the other variables are as defined herein.

In some embodiments of the present disclosure, the L₁ described above is selected from —NH— and —N(CH₃)—; the other variables are as defined herein.

In some embodiments of the present disclosure, the L₂ described above is selected from a single bond, —O—, —NH—C(=O)—, —NH—CH₂— and —N(CH₃)—CH₂—; the other variables are as defined herein.

In some embodiments of the present disclosure, the ring B described above is selected from phenyl, pyridinyl, pyrimidinyl, pyrazinyl and pyridazinyl; the other variables are as defined herein.

In some embodiments of the present disclosure, the structural unit

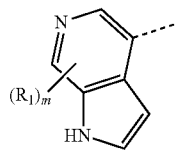

described above is selected from

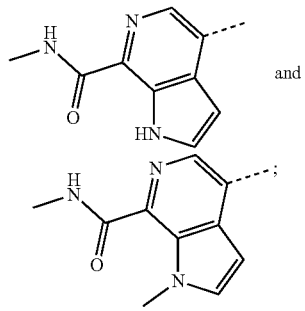

the other variables are as defined herein.

In some embodiments of the present disclosure, the L₂ described above is selected from a structural unit

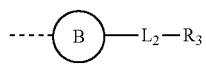

selected from

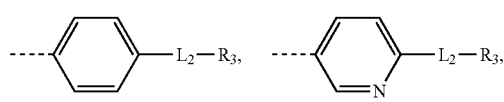

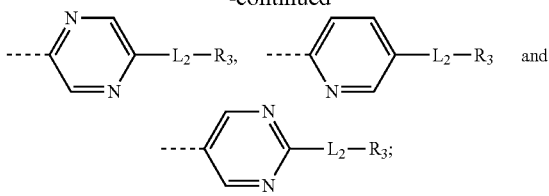

the other variables are as defined herein.

In some embodiments of the present disclosure, the structural unit

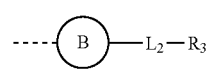

described above is selected from

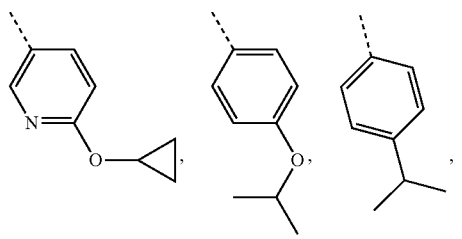

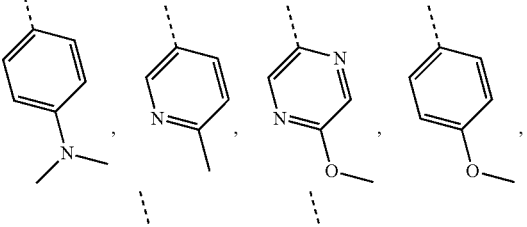

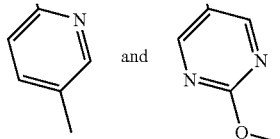

the other variables are as defined herein.

The present disclosure provides a compound of formula (I) or a pharmaceutically acceptable salt thereof,

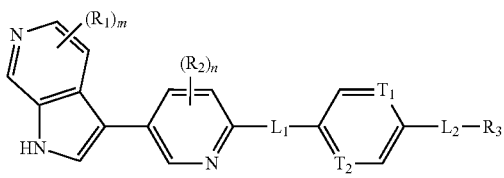

(I)

wherein,

T₁ and T₂ are each independently selected from N and CH;

R₁ is selected from F, Cl, Br, I, C$_{1-3}$ alkyl, C$_{1-3}$ alkoxy, —C(=O)—C$_{1-3}$ alkyl and —C(=O)—NH—C$_{1-3}$ alkyl, the C$_{1-3}$ alkyl, C$_{1-3}$ alkoxy, —C(=O)—C$_{1-3}$ alkyl and —C(=O)—NH—C$_{1-3}$ alkyl being optionally substituted with 1, 2 or 3 R$_a$;

$R_2$ is selected from F, Cl, Br, I and $C_{1-3}$ alkyl, the $C_{1-3}$ alkyl being optionally substituted with 1, 2 or 3 $R_b$;

$R_3$ is selected from $C_{1-3}$ alkyl and $C_{3-5}$ cycloalkyl, the $C_{1-3}$ alkyl and $C_{3-5}$ cycloalkyl being optionally substituted with 1, 2 or 3 $R_c$;

m and n are each independently selected from 0, 1 and 2;

$L_1$ is selected from —N($R_d$)—;

$L_2$ is selected from —O—, —N($R_a$)—C(=O)— and —N($R_d$)—C($R_e$)($R_f$)—;

$R_a$, $R_b$ and $R_c$ are each independently selected from F, Cl, Br, I and $CH_3$;

$R_d$, $R_e$ and $R_f$ are each independently selected from H and $CH_3$.

In some embodiments of the present disclosure, the $R_1$ described above is selected from F, Cl, Br, I, $CH_3$, $OCH_3$, —C(=O)—$CH_3$ and —C(=O)—NH—$CH_3$, the $CH_3$, $OCH_3$, —C(=O)—$CH_3$ and —C(=O)—NH—$CH_3$ being optionally substituted with 1, 2 or 3 $R_a$; the other variables are as defined herein.

In some embodiments of the present disclosure, the $R_1$ described above is selected from F, Cl, Br, I, $CH_3$, $CHF_2$, $CF_3$, $OCH_3$, —C(=O)—$CH_3$ and —C(=O)—NH—$CH_3$; the other variables are as defined herein.

In some embodiments of the present disclosure, the $R_2$ described above is selected from F, Cl, Br, I and $CH_3$, the $CH_3$ being optionally substituted with 1, 2 or 3 $R_b$; the other variables are as defined herein.

In some embodiments of the present disclosure, the $R_2$ described above is selected from F, Cl, Br, I, $CH_3$, $CH_2F$, $CHF_2$ and $CF_3$; the other variables are as defined herein.

In some embodiments of the present disclosure, the $R_3$ described above is selected from $CH_3$ and cyclopropyl, the $CH_3$ and cyclopropyl being optionally substituted with 1, 2 or 3 $R_c$; the other variables are as defined herein.

In some embodiments of the present disclosure, the $R_3$ described above is selected from $CH_3$, $CF_3$ and cyclopropyl; the other variables are as defined herein.

In some embodiments of the present disclosure, the $L_1$ described above is selected from —NH— and —N($CH_3$)—; the other variables are as defined herein.

In some embodiments of the present disclosure, the $L_2$ described above is selected from —O—, —NH—C(=O)— and —NH—$CH_2$—; the other variables are as defined herein.

In some embodiments of the present disclosure, the structural unit

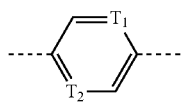

described above is selected from

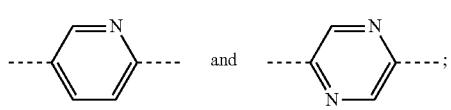

the other variables are as defined herein.

In some embodiments of the present disclosure, the structural unit

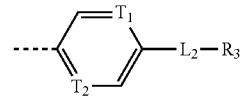

described above is selected from

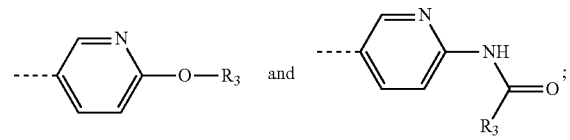

the other variables are as defined herein.

In some embodiments of the present disclosure, the structural unit

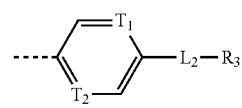

described above is selected from

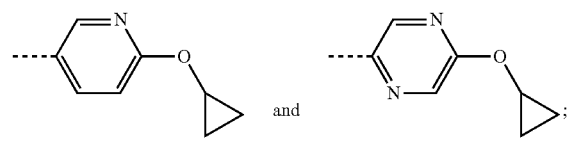

the other variables are as defined herein. Still some other embodiments of the present disclosure are derived from any combination of the variables described above.

In some embodiments of the present disclosure, the compound or the pharmaceutically acceptable salt thereof described above is selected from:

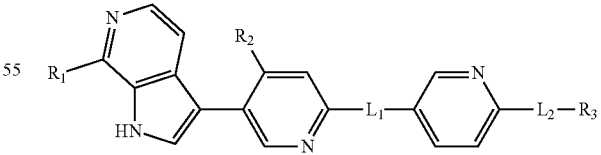

(I-1)

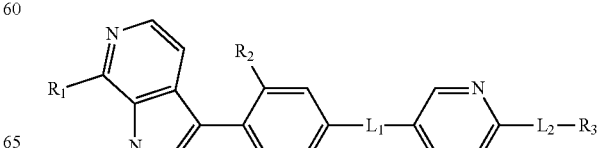

(I-2)

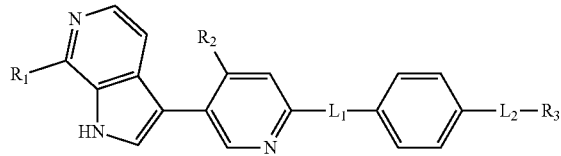
(P-1)

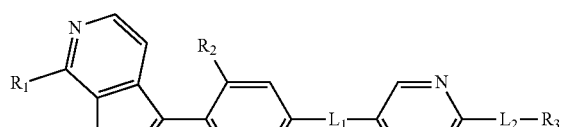
(P-2)

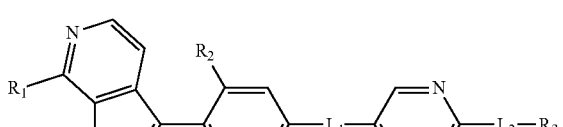
(P-3)

wherein,

R$_1$, R$_2$, R$_3$, L$_1$ and L$_2$ are as defined herein.

In some embodiments of the present disclosure, the compound or the pharmaceutically acceptable salt thereof described above is selected from:

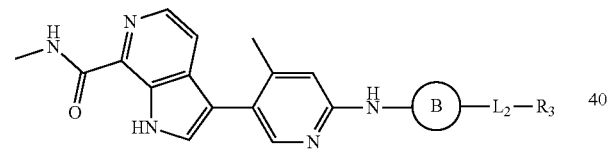
(P-4)

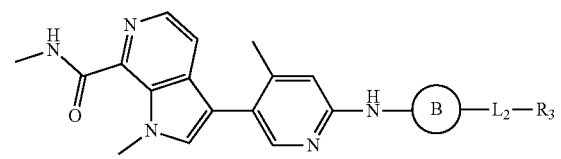
(P-5)

wherein, ring B is selected from

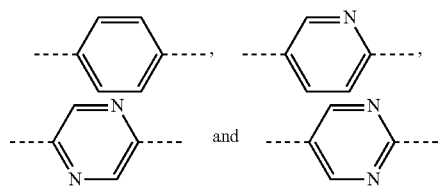

R$_3$ and L$_2$ are as defined herein.

The present disclosure also provides compounds of the following formulas or pharmaceutically acceptable salts thereof,

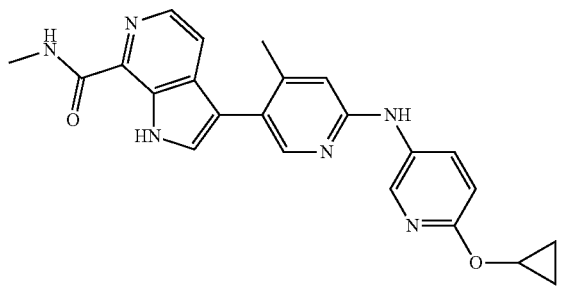

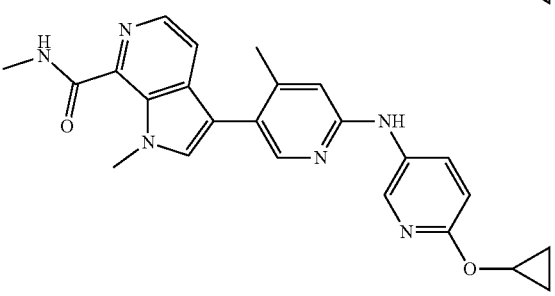

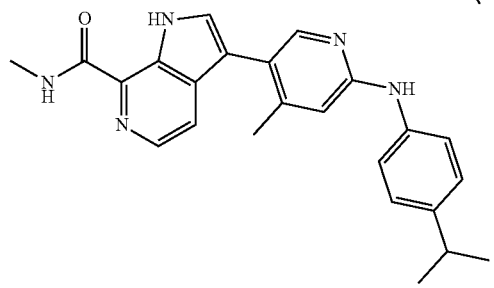

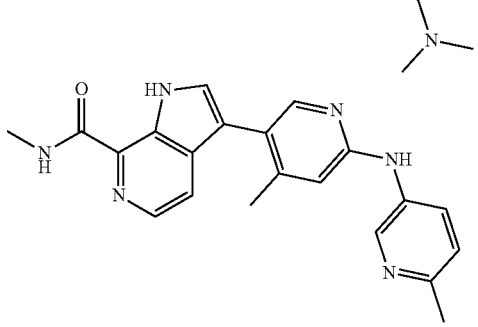

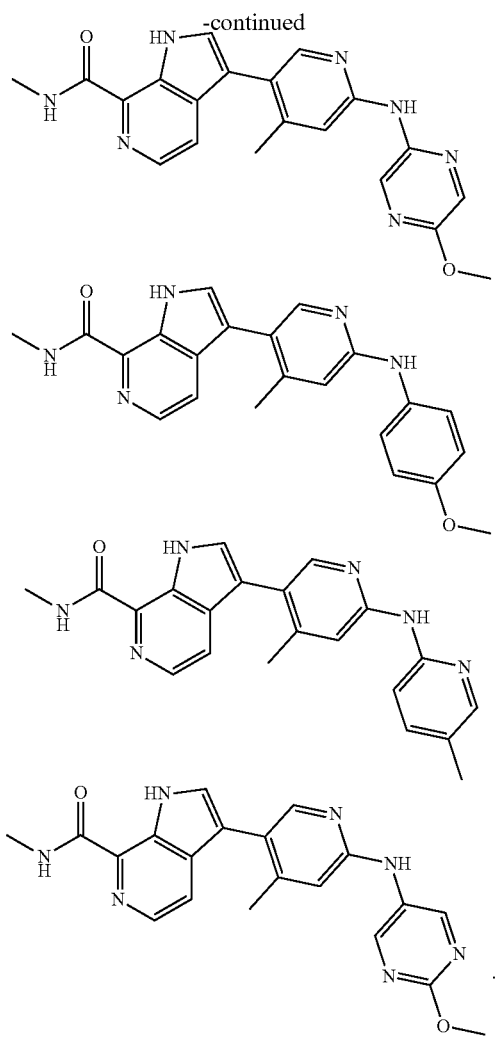
-continued

The present disclosure also provides use of the compound or the pharmaceutically acceptable salt thereof described above for manufacturing a medicament for the treatment of tenosynovial giant cell tumor.

Technical Effects

The compounds of the present disclosure have a significant inhibition effect on CSF-1R kinase; the compounds of the present disclosure have a weak degree of inhibition on five CYP isoenzymes, and reduce the risk caused by drug combination; the compounds of the present disclosure have excellent pharmacokinetic properties and in vivo efficacy.

Definitions and Description

Unless otherwise stated, the following terms and phrases used herein are intended to have the following meanings. A particular term or phrase, unless otherwise specifically defined, should not be considered uncertain or unclear, but should be construed according to its common meaning. When referring to a trade name, it is intended to refer to its corresponding commercial product or its active ingredient.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" refers to a salt of the compound of the present disclosure, which is prepared from the compound having particular substituents disclosed herein and a relatively nontoxic acid or base. When the compounds of the present disclosure contain a relatively acidic functional group, a base addition salt can be obtained by contacting the neutral form of such a compound with a sufficient amount of base in a pure solution or a suitable inert solvent. Pharmaceutically acceptable base addition salts include sodium, potassium, calcium, ammonium, organic amine, or magnesium salts, or similar salts. When the compounds of the present disclosure contain a relatively basic functional group, an acid addition salt can be obtained by contacting the neutral form of such a compound with a sufficient amount of acid in a pure solution or a suitable inert solvent. Examples of pharmaceutically acceptable acid addition salts include salts derived from inorganic acids, such as hydrochloric acid, hydrobromic acid, nitric acid, carbonic acid, bicarbonate radical, phosphoric acid, monohydrogen phosphate, dihydrogen phosphate, sulfuric acid, hydrogen sulfate, hydroiodic acid and phosphorous acid; and salts derived from organic acids, such as acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid and methanesulfonic acid. Also included are salts of amino acids (e.g., arginine) and salts of organic acids such as glucuronic acid. Certain specific compounds of the present disclosure contain both basic and acidic functional groups that allow the compounds to be converted into either base or acid addition salts.

The pharmaceutically acceptable salts of the present disclosure can be synthesized from a parent compound having an acidic or basic group by conventional chemical methods. In general, such salts are prepared by the following method: reacting the free acid or base form of the compound with a stoichiometric amount of the appropriate base or acid in water or an organic solvent or a mixture thereof.

Unless otherwise stated, the term "isomer" is intended to include geometric isomers, cis-trans isomers, stereoisomers, enantiomers, optical isomers, diastereoisomers and tautomers.

The compounds of the present disclosure may be in the form of a specific geometric isomer or stereoisomer. All such compounds are contemplated herein, including cis and trans isomers, (−)- and (+)-enantiomers, (R)- and (S)-enantiomers, diastereoisomers, (D)-isomers, (L)-isomers, and racemic mixtures and other mixtures thereof, such as an enantiomer or diastereoisomer enriched mixture, all of which are encompassed within the scope of the present disclosure. Substituents such as alkyl may have an additional asymmetric carbon atom. All these isomers and mixtures thereof are encompassed within the scope of the present disclosure.

Unless otherwise stated, the term "enantiomer" or "optical isomer" refers to stereoisomers that are mirror images of each other.

Unless otherwise stated, the term "cis-trans isomer" or "geometric isomer" results from the inability of a single bond of a ring carbon atom or a double bond to rotate freely.

Unless otherwise stated, the term "diastereoisomer" refers to stereoisomers in which molecules each have two or more chiral centers and are not mirror images of each other.

Unless otherwise stated, "(D)" or "(+)" stands for dextrorotation, "(L)" or "(−)" stands for levorotation, and "(DL)" or "(±)" stands for racemization.

Unless otherwise stated, the absolute configuration of a stereogenic center is represented by a wedged solid bond (⬩) and a wedged dashed bond (⬩⬩⬩), and the relative configuration of a stereogenic center is represented by a straight solid bond (—) and a straight dashed bond (⬩⬩⬩). A wavy line (∼) represents a wedged solid bond (⬩) or a wedged dashed bond (⬩⬩⬩) or a wavy line (∼) represents a straight solid bond (—) and a straight dashed bond (⬩⬩⬩).

Unless otherwise stated, the term "enriched with one isomer", "isomer enriched", "enriched with one enantiomer" or "enantiomer enriched" means that the content of one of the isomers or enantiomers is less than 100% and more than or equal to 60%, or more than or equal to 70%, or more than or equal to 80%, or more than or equal to 90%, or more than or equal to 95%, or more than or equal to 96%, or more than or equal to 97%, or more than or equal to 98%, or more than or equal to 99%, or more than or equal to 99.5%, or more than or equal to 99.6%, or more than or equal to 99.7%, or more than or equal to 99.8%, or more than or equal to 99.9%.

Unless otherwise stated, the term "isomeric excess" or "enantiomeric excess" refers to the difference between the relative percentages of two isomers or enantiomers. For example, if the content of one of the isomers or enantiomers is 90% and the content of the other isomer or enantiomer is 10%, the isomeric or enantiomeric excess (ee value) is 80%.

Optically active (R)- and (S)-isomers and D and L isomers can be prepared by chiral synthesis or chiral reagents or other conventional techniques. If one enantiomer of a certain compound of the present disclosure is to be obtained, the desired pure enantiomer can be prepared by asymmetric synthesis or derivatization using a chiral auxiliary, wherein the resulting diastereoisomeric mixture is separated and the auxiliary group is cleaved. Alternatively, when the molecule contains a basic functional group (such as amino) or an acidic functional group (such as carboxyl), the compound reacts with an appropriate optically active acid or base to form a salt of the diastereoisomer, which is then subjected to resolution of diastereoisomers through conventional methods in the art to acquire the pure enantiomer. Furthermore, the enantiomer and the diastereoisomer are generally isolated through chromatography using a chiral stationary phase, optionally in combination with chemical derivatization (e.g., generating carbamate from amines).

The compounds of the present disclosure may contain an unnatural proportion of atomic isotope at one or more of the atoms that constitute the compound. For example, the compound may be labeled with a radioisotope, such as tritium ($^3$H), iodine-125 ($^{125}$I) or C-14 ($^{14}$C). For another example, hydrogen can be substituted with deuterium to form a deuterated drug, and the bond formed by deuterium and carbon is firmer than that formed by common hydrogen and carbon. Compared with an un-deuterated drug, the deuterated drug has the advantages of reduced toxic side effect, increased stability, enhanced efficacy, prolonged biological half-life and the like. All isotopic variations of the compound of the present disclosure, whether radioactive or not, are encompassed within the scope of the present disclosure.

The term "optional" or "optionally" means that the subsequently described event or circumstance may, but not necessarily, occur, and the description includes instances where the event or circumstance occurs and instances where it does not.

The term "substituted" means that one or more hydrogen atoms on a specific atom are substituted with substituents which may include deuterium and hydrogen variants, as long as the valence of the specific atom is normal and the substituted compound is stable. When the substituent is oxygen (i.e., =O), it means that two hydrogen atoms are substituted. Substitution with oxygen does not occur on aromatic groups. The term "optionally substituted" means that an atom can be substituted with a substituent or not. Unless otherwise specified, the type and number of the substituent may be arbitrary as long as being chemically achievable.

When any variable (e.g., R) occurs more than once in the constitution or structure of a compound, the variable is independently defined in each case. Thus, for example, if a group is substituted with 0-2 R, the group can be optionally substituted with up to two R, and the definition of R in each case is independent. Furthermore, a combination of a substituent and/or a variant thereof is permissible only if the combination can result in a stable compound.

When the number of a linking group is 0, for example, —(CRR)$_0$—, it means that the linking group is a single bond.

When the number of a substituent is 0, it means that there is no such a substituent in a structure. For example, -A-(R)$_0$ means that the structure is actually -A.

When a substituent is absent, it means that there is no such a substituent. For example, when X in A-X is absent, the structure is actually A.

When one of variables is selected from a single bond, it means that the two groups which it links are linked directly. For example, when L in A-L-Z represents a single bond, it means that the structure is actually A-Z.

When a bond of a substituent is cross-linked to one or more atoms on a ring, the substituent can be bonded to any atom on the ring. For example, structural unit

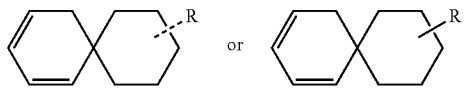

represents that the substitution with substituent R may occur in any one position on cyclohexyl or cyclohexadienyl. When it is not specified by which atom the listed substituent is linked to the group to be substituted, the substituent can be linked via any atom of the group. For example, pyridinyl as a substituent can be linked to the group to be substituted via any carbon atom on the pyridine ring.

When the listed linking group does not indicate the direction for linking, the direction for linking is arbitrary. For example, when the linking group L contained in

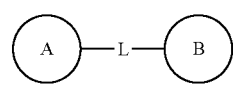

is -M-W-, -M-W- can either link ring A and ring B in a direction same as left-to-right reading order to form

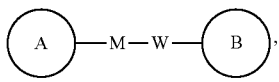

or link ring A and ring B in an opposing direction to form

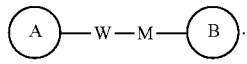

A combination of the linking group, a substituent and/or a variant thereof is permissible only if the combination can result in a stable compound.

Unless otherwise specified, when a group has one or more linkable sites, any one or more of the sites of the group may be linked to other groups by chemical bonds. When there is no designated linking mode for a chemical bond and H atoms are present at a linkable site, the number of the H atoms at the linkable site is correspondingly reduced based on the number of the linked chemical bonds, and a group with a corresponding valence number is thus formed. The chemical bond that links the site to another group may be represented by a straight solid bond (—), a straight dashed line bond (----), or a wavy line (

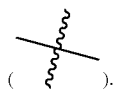

).

For example, the straight solid bond in —OCH$_3$ refers to being linked to another group via the oxygen atom in the group; the straight dashed bond in

refers to being linked to another group via two ends of the nitrogen atom in the group; the wavy line in

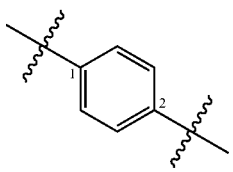 [SMILES: *c1ccc(*)cc1]

refers to being linked to another group via the carbon atoms at positions 1 and 2 in the phenyl group;

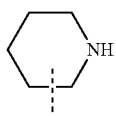

means that any linkable site on the piperidyl can be linked to another group via 1 chemical bond, and at least 4 linking modes

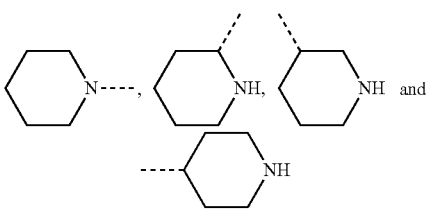

are possible; even if —N— is linked to an H atom,

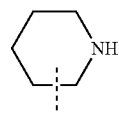

includes the linking mode of

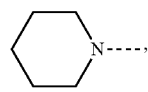

except that when 1 chemical bond is linked to a site, the number of H at that site is correspondingly reduced by 1 and a monovalent piperidyl is thus formed.

Unless otherwise specified, the number of atoms on a ring is generally defined as the member number of the ring. For example, "5-7 membered ring" refers to a "ring" on which 5 to 7 atoms are arranged in a circle.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl and the like, and may be monovalent (e.g., methyl), divalent (e.g., methylene), or polyvalent (e.g., methenyl). Examples of $C_{1-3}$ alkyl include, but are not limited to, methyl (Me), ethyl (Et), propyl (including n-propyl and isopropyl) and the like.

Unless otherwise specified, the term "$C_{1-3}$ alkoxy" refers to those alkyl groups that each contain 1 to 3 carbon atoms and are linked to the rest part of the molecule through an oxygen atom. The $C_{1-3}$ alkoxy includes $C_{1-2}$, $C_{2-3}$, $C_3$ and $C_2$ alkoxy, and the like. Examples of $C_{1-3}$ alkoxy include, but are not limited to, methoxy, ethoxy, propoxy (including n-propoxy and isopropoxy) and the like.

Unless otherwise specified, "$C_{3-5}$ cycloalkyl" refers to a saturated monocyclic hydrocarbon group consisting of 3 to 5 carbon atoms. The $C_{3-5}$ cycloalkyl includes $C_{3-4}$ cycloalkyl, $C_{4-5}$ cycloalkyl, and the like, and may be monovalent, divalent or polyvalent. Examples of $C_{3-5}$ cycloalkyl include, but are not limited to, cyclopropyl, cyclobutyl, cyclopentyl, cyclohexyl, and the like.

Unless otherwise specified, the terms "6-membered heteroaryl ring" and "6-membered heteroaryl" are used interchangeably herein, and the term "6-membered heteroaryl" refers to a monocyclic group consisting of 6 ring atoms with a conjugated π-electron system, of which 1, 2, 3 or 4 ring atoms are heteroatoms independently selected from O, S and N, and the rest are carbon atoms. The nitrogen atom is optionally quaternized, and the nitrogen and sulfur heteroatoms can be optionally oxidized (i.e., NO and S(O)$_p$, wherein p is 1 or 2). The 6-membered heteroaryl can be linked to the rest of the molecule through a heteroatom or a carbon atom. Examples of the 6-membered heteroaryl include, but are not limited to, pyridinyl (including 2-pyridinyl, 3-pyridinyl, 4-pyridinyl, etc.), pyrazinyl or pyrimidinyl (including 2-pyrimidinyl, 4-pyrimidinyl, etc.).

The term "post-treatment" means that the hydrochloride or trifluoroacetate of the compound of the present disclosure is dissolved in an organic solvent such as ethyl acetate or dichloromethane, washed with 1 N sodium bicarbonate solution and subjected to concentration of the organic phase so that the free state of the compound can be obtained.

The compounds of the present disclosure can be prepared by a variety of synthetic methods well known to those skilled in the art, including the specific embodiments listed below, embodiments formed by combinations thereof with other chemical synthetic methods, and equivalents thereof known to those skilled in the art. Preferred embodiments include, but are not limited to, the examples of the present disclosure.

The solvents used in the present disclosure are commercially available.

The following abbreviations are used in the present disclosure: aq for water; eq for equivalent; DCM for dichloromethane; PE for petroleum ether; DMF for N,N-dimethylformamide; DMSO for dimethyl sulfoxide; EtOAc for ethyl acetate; EtOH for ethanol; MeOH for methanol; CBz for benzyloxycarbonyl, an amine protective group; BOC for tert-butyloxycarbonyl, an amine protective group; r.t. for room temperature; O/N for overnight; THF for tetrahydrofuran; Boc$_2$O for di-tent-butyl dicarbonate; TFA for trifluoroacetic acid; DIPEA for diisopropylethylamine; mp for melting point; Pd(dppf)Cl$_2$ for [1,1'-bis(diphenylphosphino)ferrocene]dichloropalladium(II); and Pd(dppf)Cl$_2$CH$_2$Cl$_2$ for [1,1'-bis(diphenylphosphino)ferrocene]dichloropalladium(II) dichloromethane complex.

The structures of the compounds of the present disclosure can be confirmed by conventional methods well known to those skilled in the art, and if the present disclosure relates to an absolute configuration of the compound, the absolute configuration can be confirmed by means of conventional techniques in the art. For example, in the single crystal X-ray diffraction (SXRD) method, intensity data of diffraction of the single crystal grown are collected with a Bruker D8 venture diffractometer, the light source is CuKα radiation, and the scanning mode is φ/□ scanning; after related data are collected, the direct method (Shelxs97) is further employed to analyze the crystal structure, and thus the absolute configuration can be confirmed.

Compounds are named according to conventional nomenclature rules in the art or using ChemDraw® software, and supplier's catalog names are given for commercially available compounds.

BRIEF DESCRIPTION OF THE DRAWING

The FIGURE shows the splenomegaly experiment in mice.

DETAILED DESCRIPTION

The present disclosure is described in detail below by way of examples. However, this is by no means disadvantageously limiting the scope of the present disclosure. Although the present disclosure has been described in detail herein and specific examples have also been disclosed, it will be apparent to those skilled in the art that various changes and modifications can be made to the specific examples without departing from the spirit and scope of the present disclosure.

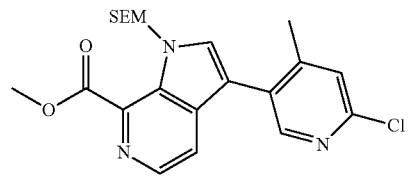

Intermediate I

Synthetic route:

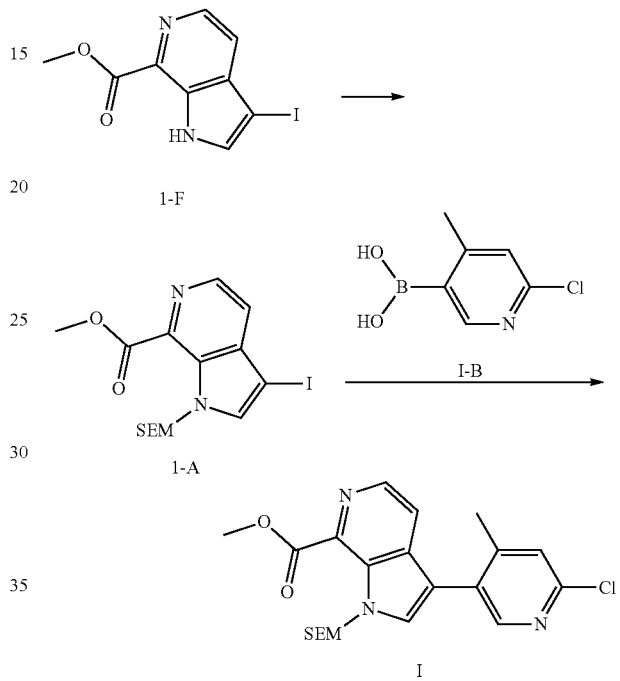

Step 1: synthesis of compound I-A

Compound 1-F (1 g, 3.31 mmol, 1 eq) was dissolved in tetrahydrofuran (10 mL). The reaction solution was cooled to 0° C., followed by the addition of sodium hydride (158.90 mg, 3.97 mmol, 60% purity, 1.2 eq). The reaction solution was stirred at 0° C. for 0.5 h. Subsequently, (2-(chloromethoxy)ethyl)trimethylsilane (717.51 mg, 4.30 mmol, 761.69 μL, 1.3 eq) was added. The reaction solution was stirred at 20° C. for 1 h. The reaction solution was poured into water (20 mL) under a slight nitrogen flow and quenched with stirring. Ethyl acetate (40 mL) was added for extraction. The organic phase was washed with saturated saline solution, dried and filtered to give intermediate I-A. MS m/z: 432.9 [M+H]$^+$.

Step 2: synthesis of compound I

Compound I-A (1 g, 2.31 mmol) was dissolved in 1,4-dioxane (10 mL) and water (1 mL), and compound I-B (495.54 mg, 2.89 mmol), Pd(dppf)Cl$_2$ (169.25 mg, 231.31 μmol) and potassium phosphate (1.47 g, 6.94 mmol) were added. The reaction solution was bubbled with nitrogen for 1 min, and reacted in a microwave reactor at 60° C. for 45 min (3 batches were fed in parallel). After the 3 reaction solutions were mixed, water (50 mL) and ethyl acetate (100 mL) were added. Liquid separation was performed. The organic phase was washed with saturated saline solution (50 mL), dried over anhydrous sodium sulfate, and concentrated at reduced pressure to remove the solvent, and a crude product was obtained. The crude product was separated by column chromatography (petroleum ether:ethyl acetate=10:1-4:1) to give compound I.

MS m/z: 432.1 [M+H]⁺;

1H NMR (400 MHz, CDCl$_3$) δ=8.40 (d, J=5.3 Hz, 1H), 8.30 (s, 1H), 7.47 (d, J=5.3 Hz, 1H), 7.41 (s, 1H), 7.33 (s, 1H), 5.79 (s, 2H), 4.08 (s, 3H), 3.35-3.26 (m, 2H), 2.26 (s, 3H), 0.84-0.77 (m, 2H), 0.09 (s, 9H).

Intermediate II

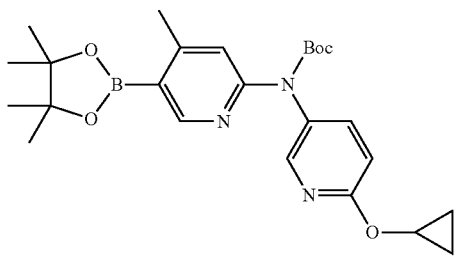

Synthetic route:

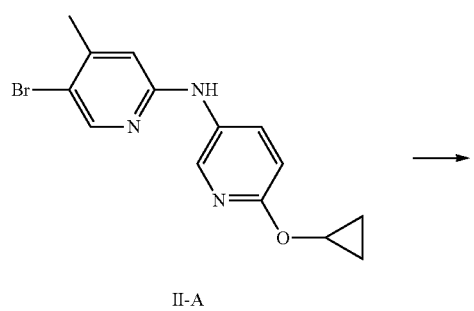

II-A

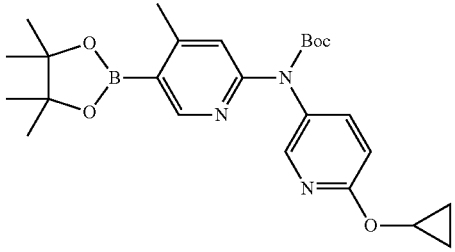

II

Step 1: synthesis of compound II-B

Compound II-A (200 mg, 624.64 μmol) was dissolved in dichloromethane (5 mL), and Boc$_2$O (272.65 mg, 1.25 mmol, 287.00 μL) and 4-dimethylaminopyridine (38.16 mg, 312.32 μmol) were added. The reaction solution was stirred at 25-30° C. for 1 h. The reaction solution was concentrated at reduced pressure to give a crude product, which was separated by column chromatography (ethyl acetate:petroleum ether=0%-5%-10%) to give compound II-B.

MS m/z: 420.1 [M+H]⁺.

Step 2: synthesis of compound II

Compound II-B (110 mg, 261.72 μmol) was dissolved in 1,4-dioxane (2 mL), and bis(pinacolato)diboron (73.11 mg, 287.89 μmol) and potassium acetate (51.37 mg, 523.44 μmol) were added. After the reaction system was bubbled with nitrogen for 30 s, Pd(dppf)Cl$_2$CH$_2$Cl$_2$ (21.37 mg, 26.17 μmol) was added. The reaction system was bubbled with nitrogen for 30 s, and then the reaction solution was reacted in a microwave reactor at 130° C. for 2 h. The reaction solution was filtered through celite and concentrated at reduced pressure to give a crude product, which was separated by column chromatography (ethyl acetate:petroleum ether=0%-10%) to give intermediate II.

MS m/z: 468.3 [M+H]⁺;

1H NMR (400 MHz, CDCl$_3$) δ=8.59 (s, 1H), 8.03 (d, J=2.5 Hz, 1H), 7.50 (dd, J=2.8, 8.8 Hz, 1H), 7.41 (s, 1H), 6.77 (d, J=8.8 Hz, 1H), 4.29-4.07 (m, 1H), 2.54 (s, 3H), 1.45 (s, 9H), 1.32 (s, 12H), 0.81-0.76 (m, 4H).

EXAMPLE 1

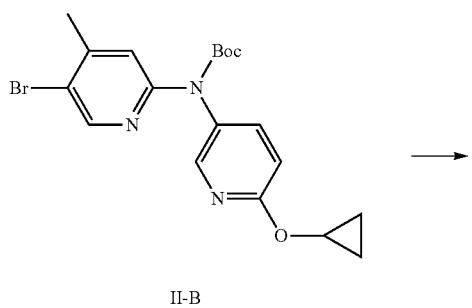

II-B

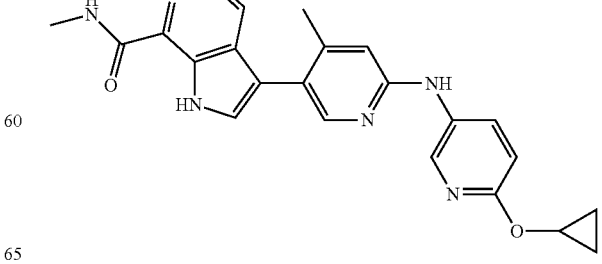

Synthetic route:

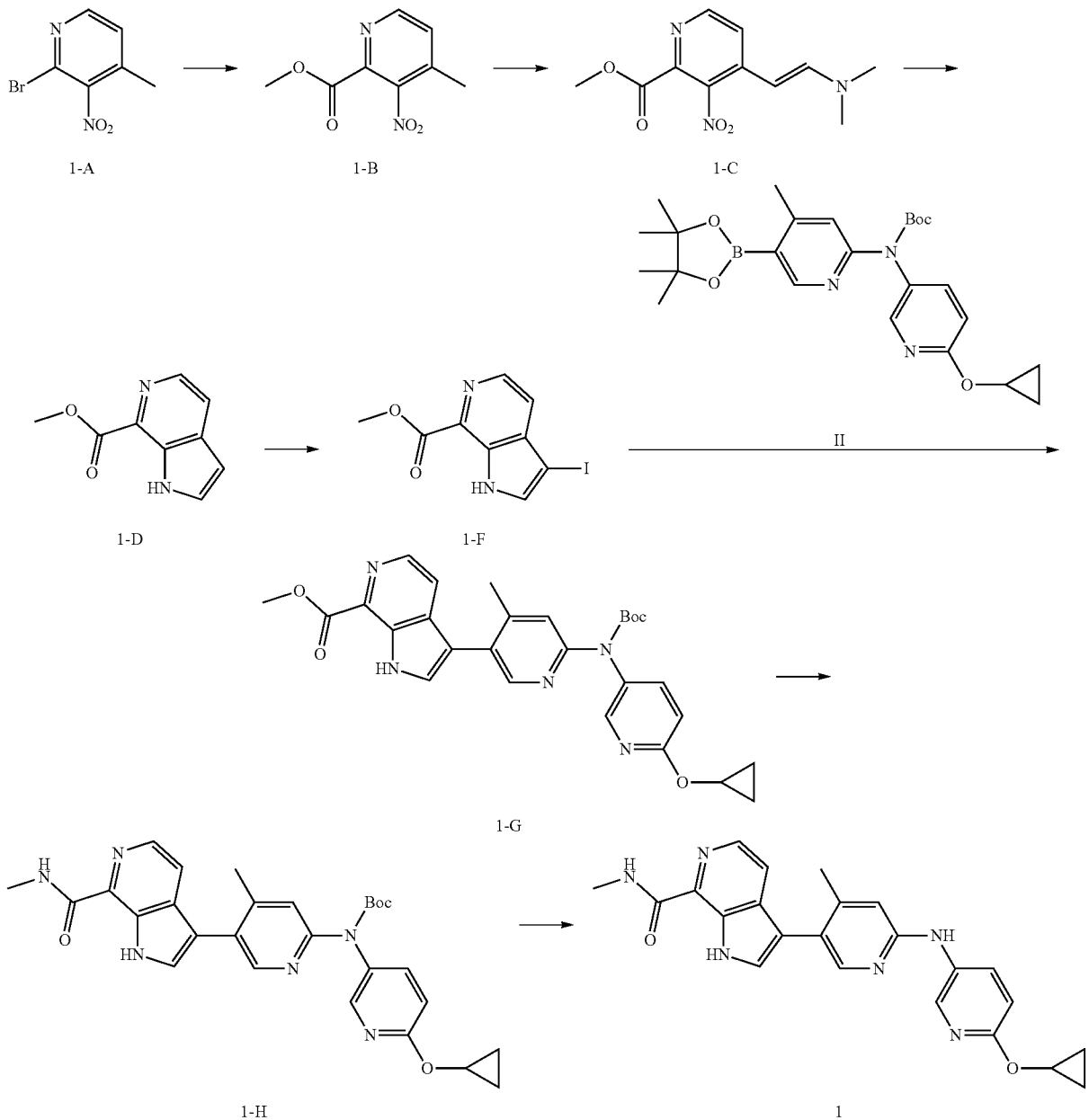

Step 1: synthesis of compound 1-B

Compound 1-A (700 mg, 3.23 mmol), Pd(dppf)Cl$_2$ (236.01 mg, 322.55 μmol) and triethylamine (1.63 g, 16.13 mmol) were mixed in methanol (3 mL) and N,N-dimethylformamide (30 mL). The reaction solution was stirred at 80° C. for 12 h under CO (50 Psi). After the reaction solution was filtered through celite, water (100 mL) was added. The mixture was extracted with dichloromethane (250 mL). The organic phase was washed with water (200 mL), dried over anhydrous sodium sulfate, filtered and concentrated to give a crude product, which was separated by column chromatography (tetrahydrofuran:petroleum ether =0%-10%-25%) to give compound 1-B.

MS m/z: 196.9[M+H]$^+$.

Step 2: synthesis of compound 1-C

Compound 1-B (30 mg, 152.94 μmol) and N,N-dimethylformamide dimethyl acetal (448.50 mg, 3.76 mmol) were mixed in N,N-dimethylformamide (2 mL) and the mixture was stirred at 100° C. for 12 h. The reaction solution was concentrated at reduced pressure to give a crude product, which was separated by column chromatography (petroleum ether/ethyl acetate=1:1) to give compound 1-C.

$^1$H NMR (400 MHz, CDCl$_3$) δ=8.31 (d, J=5.5 Hz, 1H), 7.36 (d, J=5.5 Hz, 1H), 7.23 (d, J=13.1 Hz, 1H), 4.97 (d, J=13.6 Hz, 1H), 3.98 (s, 3H), 3.00 (s, 6H).

Step 3: synthesis of compound 1-D

Compound 1-C (330 mg, 1.31 mmol) was dissolved in acetic acid (10 mL). Iron powder (733.52 mg, 13.13 mmol) was added, and the mixture was stirred at 70° C. for 5 h. The reaction solution was filtered through celite. The filtrate was concentrated to give a crude product, which was separated by column chromatography (tetrahydrofuran:petroleum ether=0%-50%) to give compound 1-D.

MS m/z: 176.8[M+H]$^+$.

Step 4: synthesis of compound 1-F

Compound 1-D (60 mg, 340.58 μmol) and N-iodosuccinimide (91.95 mg, 408.69 μmol) were dissolved in N,N-dimethylformamide (6 mL) and the mixture was stirred at 35° C. for 1 h. The reaction solution was concentrated at reduced pressure to give a crude product, which was separated by column chromatography (tetrahydrofuran:petroleum ether=0%-50%) to give 1-F.

MS m/z: 302.9[M+H]$^+$.

Step 5: synthesis of compound 1-G

Compound 1-F (50 mg, 165.53 μmol), intermediate II (77.36 mg, 165.53 μmol), tetrakis(triphenylphosphine)palladium(0) (19.13 mg, 16.55 μmol), and sodium carbonate (35.09 mg, 331.05 μmol) were dissolved in dioxane (2.5 mL) and water (0.25 mL). The reaction solution was purged with N$_2$ for about 30 s and stirred at microwave 100° C. for 30 min. Water (50 mL) was added into the reaction solution. The mixture was extracted with dichloromethane (100 mL) and dried over anhydrous sodium sulfate, and the desiccant was removed by filtration. The filtrate was concentrated at reduced pressure to give a crude product, which was separated by column chromatography (tetrahydrofuran:petroleum ether=0%-25%-50%) to give compound 1-G.

Step 6: synthesis of compound 1-H

Compound 1-G (30 mg, 58.19 μmol) was dissolved in a solution of methylamine in ethanol (20 mL, 33% by mass fraction) and the mixture was stirred at 45° C. for 2 h. The reaction solution was concentrated at reduced pressure to give a crude product, which was separated by column chromatography (ethyl acetate:petroleum ether =0%-10%-25%) to give compound 1-H.

MS m/z: 515.1[M+H]$^+$.

Step 7: synthesis of compound 1 hydrochloride

Compound 1-H (12 mg, 23.32 μmol) was mixed with ethyl acetate (4 mL) and hydrochloride in ethyl acetate (4 M, 20 mL) and the mixture was stirred at 18° C. for 12 h. The reaction solution was concentrated at reduced pressure to give a crude product, which was separated by preparative high performance liquid chromatography (HCl, acetonitrile) to give compound 1 hydrochloride.

MS m/z: 415.2[M+H]$^+$;

1H NMR (400 MHz, CD$_3$OD) δ=8.53 (d, J=2.0 Hz, 1H), 8.47 (s, 1H), 8.38 (d, J=6.0 Hz, 1H), 8.21 -8.13 (m, 2H), 8.02 (s, 1H), 7.46 (d, J=9.0 Hz, 1H), 7.28 (s, 1H), 4.41-4.30 (m, 1H), 3.15 (s, 3H), 2.40 (s, 3H), 0.99-0.93 (m, 2H), 0.92-0.87 (m, 2H).

EXAMPLE 2

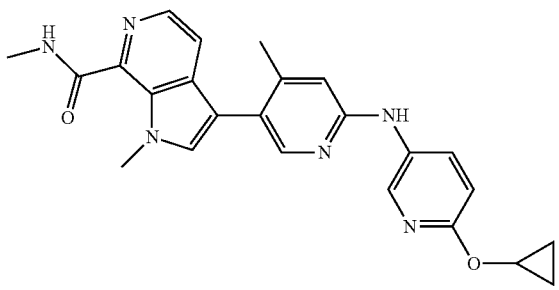 [SMILES: CNC(=O)c1nccc2c(-c3cnc(Nc4ccc(OC5CC5)nc4)cc3C)cn(C)c12]

Synthetic route:

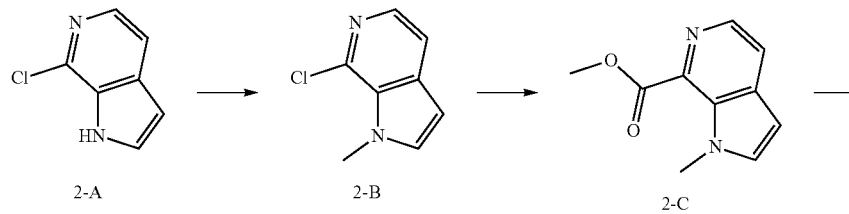

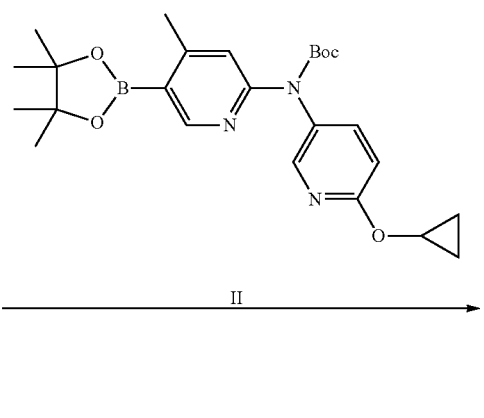

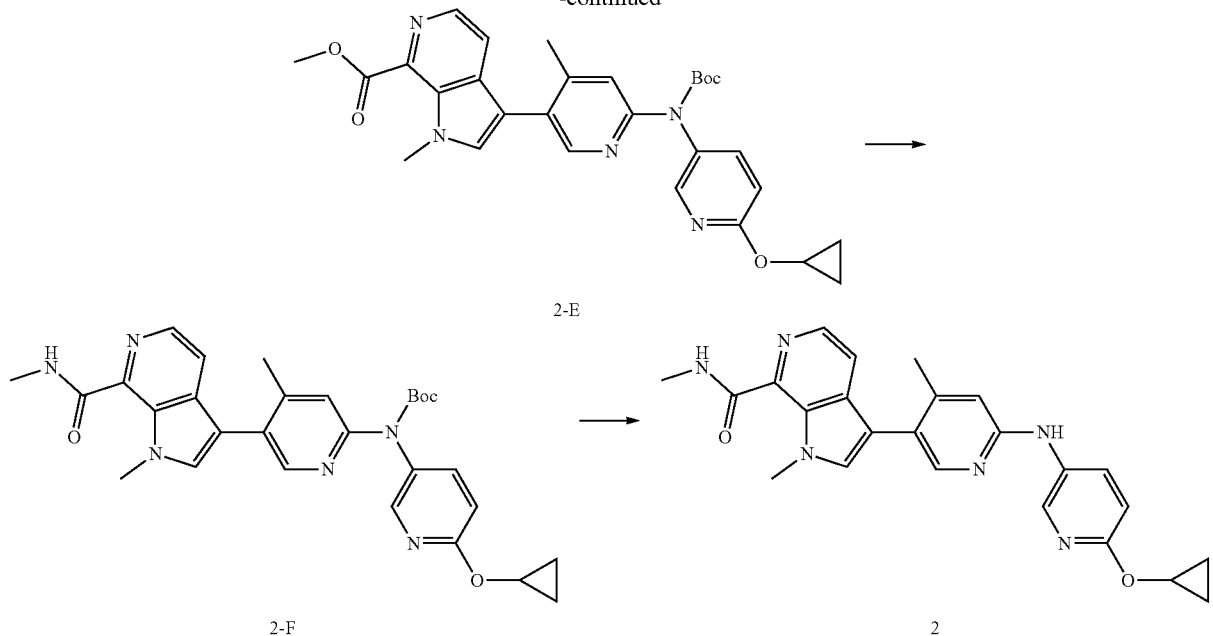

Step 1: synthesis of compound 2-B

NaH (314.56 mg, 7.86 mmol, 60% by mass fraction) was added to a solution of 2-A (1 g, 6.55 mmol) in THF (30 mL) at 0° C. The reaction mixture was stirred at 0° C. for 20 min. Iodomethane (3.44 g, 24.24 mmol, 1.51 mL) was then added and the reaction solution was stirred at 0° C. for another 1 h. After the reaction was completed, 5 mL of water was added to quench the reaction. The mixture was diluted by water (50 mL), extracted with ethyl acetate (50 mL×3), washed with saturated saline solution (50 mL×3), dried over anhydrous sodium sulfate, filtered to remove the desiccant, and concentrated at reduced pressure to give a crude product, which was purified through column chromatography (0%-20% ethyl acetate/petroleum ether) to give compound 2-B.

MS m/z: 166.9[M+H]$^+$;

$^1$H NMR (400 MHz, CDCl$_3$) δ=7.95 (d, J=5.5 Hz, 1H), 7.42 (d, J=5.4 Hz, 1H), 7.16 (d, J=3.1 Hz, 1H), 6.49 (d, J=3.1 Hz, 1H), 4.17 (s, 3H).

Step 2: synthesis of compound 2-C

A solution of 2-B (500 mg, 3.00 mmol), TEA (1.26 g, 12.45 mmol, 1.73 mL) and Pd(dppf)Cl$_2$CH$_2$Cl$_2$ (122.54 mg, 150.05 μmol) in toluene (40 mL) and methanol (40 mL) was stirred in carbon monoxide atmosphere (4 MPa) at a temperature of 110° C. for 17 h. After the reaction was completed, the mixture was concentrated at reduced pressure to give a crude product, which was purified by column chromatography (0%-30% tetrahydrofuran/petroleum ether) to give compound 2-C.

MS m/z: 190.9[M+H]$^+$;

1H NMR (400 MHz, CDCl$_3$) δ=8.30 (d, J=5.0 Hz, 1H), 7.66 (d, J=5.3 Hz, 1H), 7.22 (d, J=3.0 Hz, 1H), 6.57 (d, J=3.0 Hz, 1H), 4.06 (s, 3H), 3.97 (s, 3H).

Step 3: synthesis of compound 2-D

A solution of N-iodosuccinimide (567.78 mg, 2.52 mmol) in DMF (5 mL) was added to a solution of 2-C (400 mg, 2.10 mmol) in DMF (10 mL), and the reaction solution was stirred at 20-30° C. for 2 h. After the reaction was completed, 5 mL of water was added to quench the reaction. The mixture was diluted by water (50 mL), extracted with ethyl acetate (50 mL×3), washed with saturated saline solution (50 mL×3), dried over anhydrous sodium sulfate, filtered to remove the desiccant, and concentrated at reduced pressure to give a crude product, which was purified through column chromatography (0%-20% tetrahydrofuran/petroleum ether) to give compound 2-D.

MS m/z: 316.9[M+H]$^+$;

$^1$H NMR (400 MHz, CDCl$_3$) δ=8.39 (d, J=5.3 Hz, 1H), 7.51 (d, J=5.3 Hz, 1H), 7.32 (s, 1H), 4.06 (s, 3H), 3.99 (s, 3H).

Step 4: synthesis of compound 2-E

In N$_2$ atmosphere, a mixture of compound 2-D (150 mg, 474.54 μmol), intermediate II (443.57 mg, 949.08 μmol), tetrakis(triphenylphosphine)palladium(0) and Na$_2$CO$_3$ (100.59 mg, 949.08 μmol) in dioxane (10 mL) and water (1 mL) was stirred at 85-90° C. for 12 h. After the reaction was completed, 5 mL of water was added to quench the reaction. The mixture was diluted by water (20 mL), extracted with ethyl acetate (20 mL×3), washed with saturated saline solution (20 mL×3), dried over anhydrous sodium sulfate, filtered to remove the desiccant, and concentrated at reduced pressure to give a crude product, which was purified through column chromatography (0%-50% tetrahydrofuran/petroleum ether) to give compound 2-E.

MS m/z: 530.4 [M+H]$^+$.

Step 5: synthesis of compound 2-F

Compound 2-F was prepared with the same method as Compound 1-H in Example 1, except for the corresponding starting material.

MS m/z: 529.3 [M+H]$^+$.

Step 6: synthesis of compound 2 hydrochloride

A solution of compound 2-F (100 mg, 189.18 μmol) in hydrochloric acid/ethyl acetate (4 M, 5 mL) and MeOH (2 mL) was stirred at 40° C. for 12 h. After the reaction was completed, the mixture was filtered to give a product, which dried to give compound 2 hydrochloride.

MS m/z: 429.2 [M+H]$^+$;

1H NMR (400 MHz, CD$_3$OD) δ=8.49 (d, J=2.3 Hz, 1H), 8.39 (s, 1H), 8.32 (d, J=6.5 Hz, 1H), 8.13-8.06 (m, 2H), 7.98 (s, 1H), 7.39 (d, J=9.0 Hz, 1H), 7.24 (s, 1H), 4.38-4.25 (m, 1H), 4.13 (s, 3H), 3.13 (s, 3H), 2.37 (s, 3H), 0.98-0.80 (m, 4H).

Synthetic route:

EXAMPLE 3

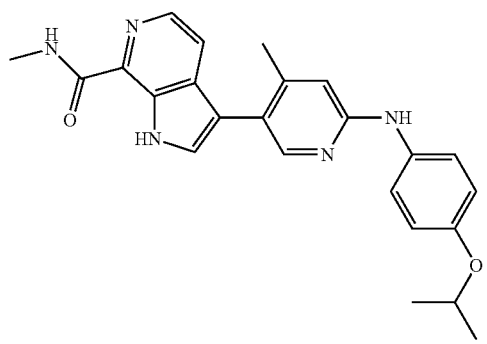 [SMILES: CNC(=O)c1nccc2c(-c3cnc(Nc4ccc(OC(C)C)cc4)cc3C)c[nH]c12]

Synthetic route:

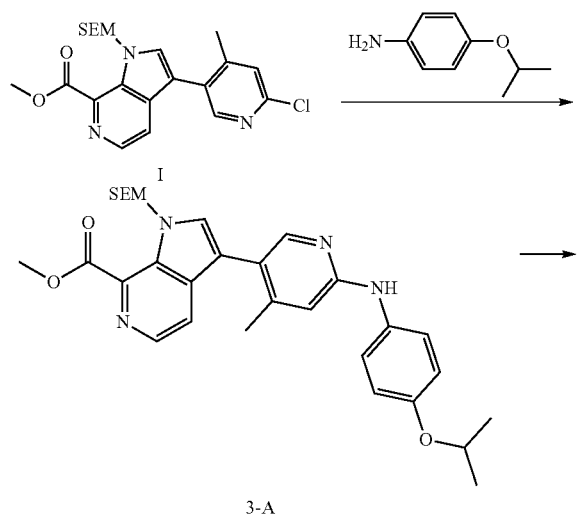

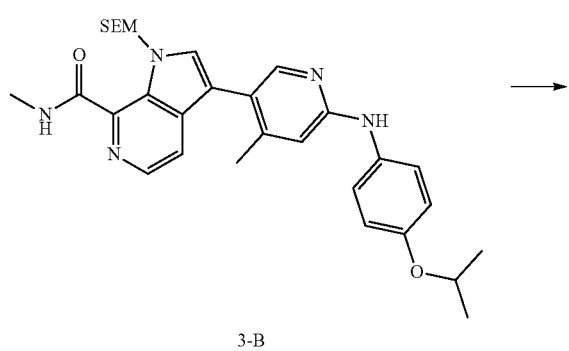

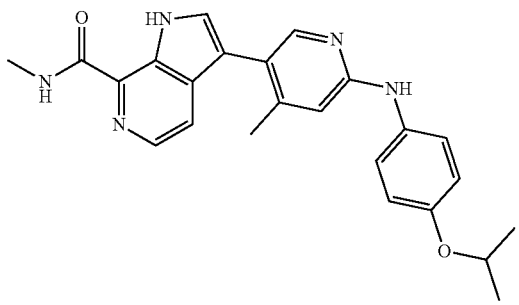

3

Step 1: synthesis of compound 3-A

In nitrogen atmosphere, intermediate I (100 mg, 231.49 μmol), 4-isopropoxyaniline (38.50 mg, 254.64 μmol), cesium carbonate (150.85 mg, 462.98 μmol), 4,5-bis(diphenylphosphino)-9,9-dimethylxanthene (26.79 mg, 46.30 μmol) and tris(dibenzylideneacetone)dipalladium (21.20 mg, 23.15 μmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-50% ethyl acetate/petroleum ether) to give compound 3-A.

MS m/z: 547.3[M+H]$^+$.

Step 2: synthesis of compound 3-B

3-A (85 mg, 155.47 μmol) was added to a solution of methylamine (5 mL, 33% purity) in ethanol. The reaction mixture was stirred at 50° C. for 2 h. After the reaction was completed, the reaction solution was concentrated at reduced pressure to give compound 3-B.

MS m/z: 546.3[M+H]$^+$.

Step 3: synthesis of compound 3 hydrochloride

3-B (85 mg, 155.47 μmol) was added to a solution of tetrabutylammonium fluoride (1 M, 10 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (70 mg, 168.48 μmol) was dissolved in ethyl acetate (10 mL) at 10-20° C. and HCl/EtOAc (4 M, 421.19 μL) was added. The reaction mixture was stirred at 40° C. for 12 h. After the reaction was completed, the reaction solution was filtered to give a filter cake, which was dried in vacuo (45° C., −0.1 MPa, 2 h) to give compound 3 hydrochloride.

MS m/z: 416.2[M+H]$^+$;

$^1$H NMR (400 MHz, CD$_3$OD) δ=8.37-8.30 (m, 2H), 8.09 (d, J=6.3 Hz, 1H), 7.83 (s, 1H), 7.35 (d, J=8.8 Hz, 2H), 7.16 (s, 1H), 7.10 (d, J=8.8 Hz, 2H), 4.68 (spt, J=6.0 Hz, 1H), 3.12 (s, 3H), 2.34 (s, 3H), 1.36 (d, J=6.0 Hz, 6H).

Example 4

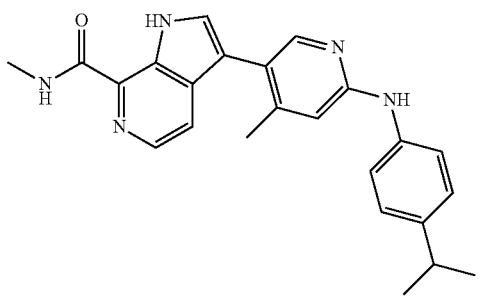 [SMILES: CNC(=O)c1nccc2c(-c3cnc(Nc4ccc(C(C)C)cc4)cc3C)c[nH]c12]

Synthetic route:

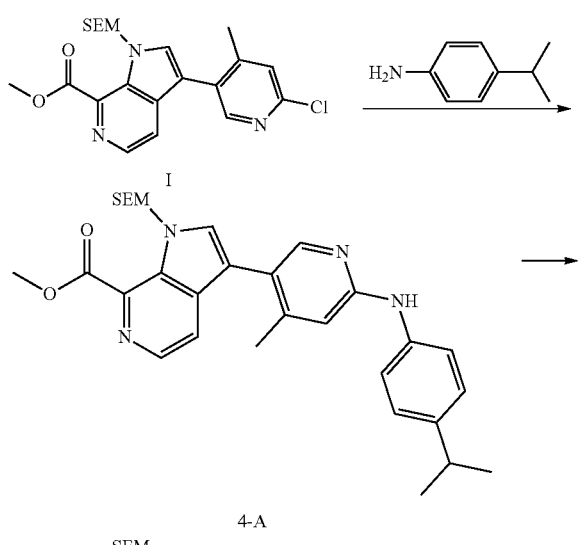

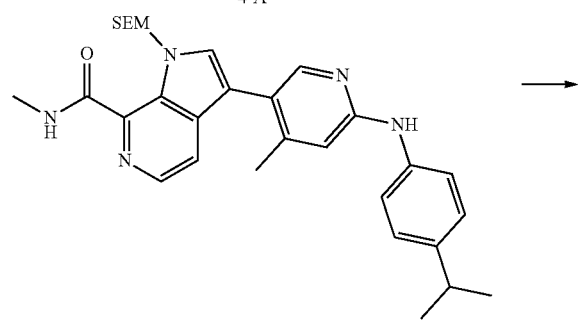

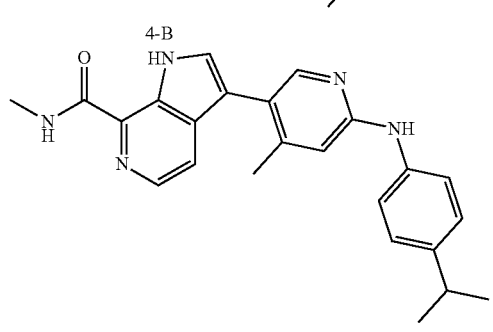

Step 1: synthesis of compound 4-A

In nitrogen atmosphere, intermediate I (100 mg, 231.49 μmol), 4-isopropylaniline (34.43 mg, 254.64 μmol), cesium carbonate (150.85 mg, 462.98 μmol), 4,5-bis(diphenylphosphino)-9,9-5 dimethylxanthene (26.79 mg, 46.30 μmol) and tris(dibenzylideneacetone)dipalladium (21.20 mg, 23.15 μmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-50% ethyl acetate/petroleum ether) to give compound 4-A.

MS m/z: 531.3 [M+H]$^+$.

Step 2: synthesis of compound 4-B

4-A (81 mg, 152.62 μmol) was added to a solution of methylamine (5 mL, 33% purity) in ethanol. The reaction mixture was stirred at 50° C. for 4 h. After the reaction was completed, the reaction solution was concentrated at reduced pressure to give compound 4-B.

MS m/z: 530.1 [M+H]$^+$.

Step 3: synthesis of compound 4 hydrochloride

4-B (81 mg, 152.90 μmol) was added to a solution of tetrabutylammonium fluoride (1 M, 15.45 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (69 mg, 172.72 μmol) was dissolved in ethyl acetate (10 mL) at 10-20° C. and HCl/EtOAc (4 M, 431.80 μL) was added. The reaction mixture was stirred at 40° C. for 12 h. After the reaction was completed, the reaction solution was filtered to give a filter cake, which was dried in vacuo (45° C., −0.1 MPa, 2 h) to give compound 4 hydrochloride.

MS m/z: 400.2[M+H]$^+$;

$^1$H NMR (400 MHz, CD$_3$OD) δ=8.42-8.31 (m, 2H), 8.11 (br s, 1H), 7.86 (s, 1H), 7.49-7.34 (m, 4H), 7.21 (s, 1H), 3.12 (s, 3H), 3.06-2.96 (m, 1H), 2.35 (s, 3H), 1.30 (d, J=7.0 Hz, 6H).

EXAMPLE 5

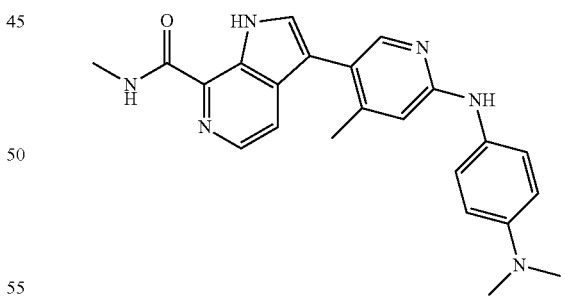

Synthetic route:

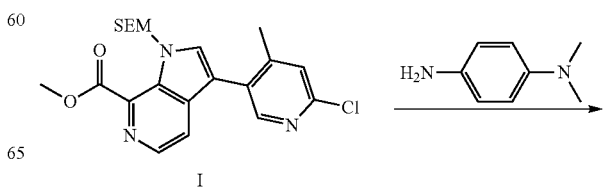

-continued

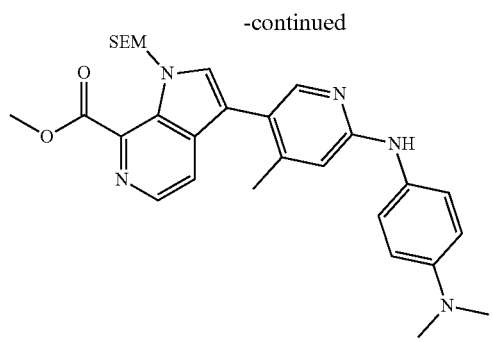

5-A

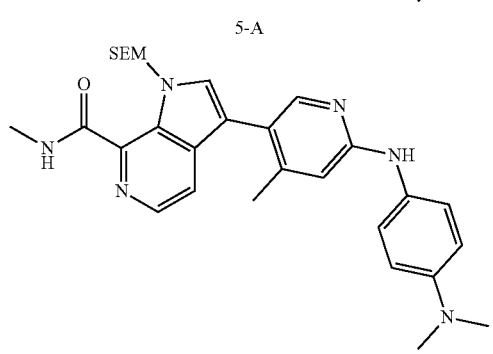

5-B

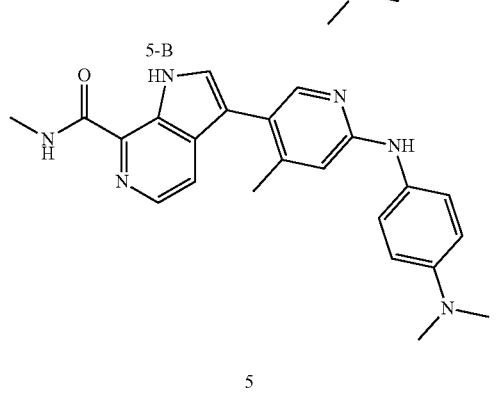

5

Step 1: synthesis of compound 5-A

In nitrogen atmosphere, intermediate I (100 mg, 231.49 µmol), N,N-dimethyl-p-phenylenediamine (34.68 mg, 254.64 µmol), cesium carbonate (150.85 mg, 462.98 µmol), 4,5-bis(diphenylphosphino)-9,9-dimethylxanthene (26.79 mg, 46.30 µmol) and tris(dibenzylideneacetone)dipalladium (21.20 mg, 23.15 µmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-50% ethyl acetate/petroleum ether) to give compound 5-A.

MS m/z: 532.3 [M+H]+.

Step 2: synthesis of compound 5-B

5-A (90 mg, 169.26 µmol) was added to a solution of methylamine (5 mL, 33% purity) in ethanol. The reaction mixture was stirred at 50° C. for 2 h. After the reaction was completed, the reaction solution was concentrated at reduced pressure to give compound 5-B.

MS m/z: 531.1[M+H]+.

Step 3: synthesis of compound 5 hydrochloride

5-B (89 mg, 167.69 µmol) was added to a solution of tetrabutylammonium fluoride (1 M, 16.95 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (65 mg, 162.31 µmol) was dissolved in ethyl acetate (10 mL) at 10-20° C. and hydrochloric acid/ethyl acetate (4 M, 405.77 µL) was added. The reaction mixture was stirred at 40° C. for 16 h. After the reaction was completed, the reaction solution was filtered to give a filter cake, which was dried in vacuo (45° C., −0.1 MPa, 2 h) to give compound 5 hydrochloride.

MS m/z: 401.2[M+H]+;

$^1$H NMR (400 MHz, CD$_3$OD) δ=8.45-8.33 (m, 2H), 8.22-8.06 (m, 1H), 8.04 (s, 1H), 7.84 (br d, J=8.8 Hz, 2H), 7.73-7.66 (m, J=8.8 Hz, 2H), 7.35 (s, 1H), 3.34 (s, 6H), 3.12 (s, 3H), 2.40 (s, 3H).

EXAMPLE 6

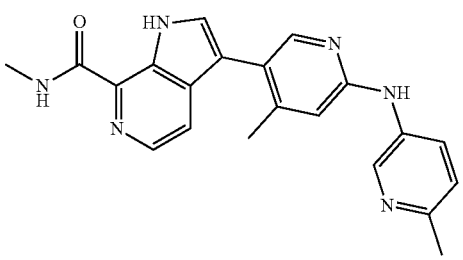 [SMILES: CNC(=O)c1nccc2c(-c3cnc(Nc4ccc(C)nc4)cc3C)c[nH]c12]

Synthetic route:

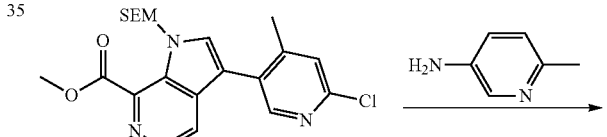

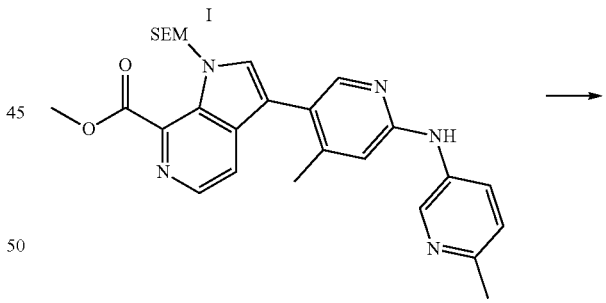

6-A

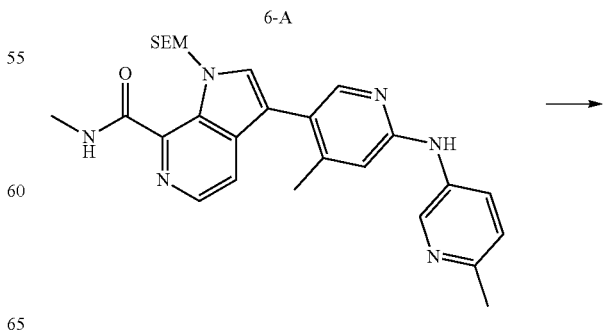

6-B

-continued

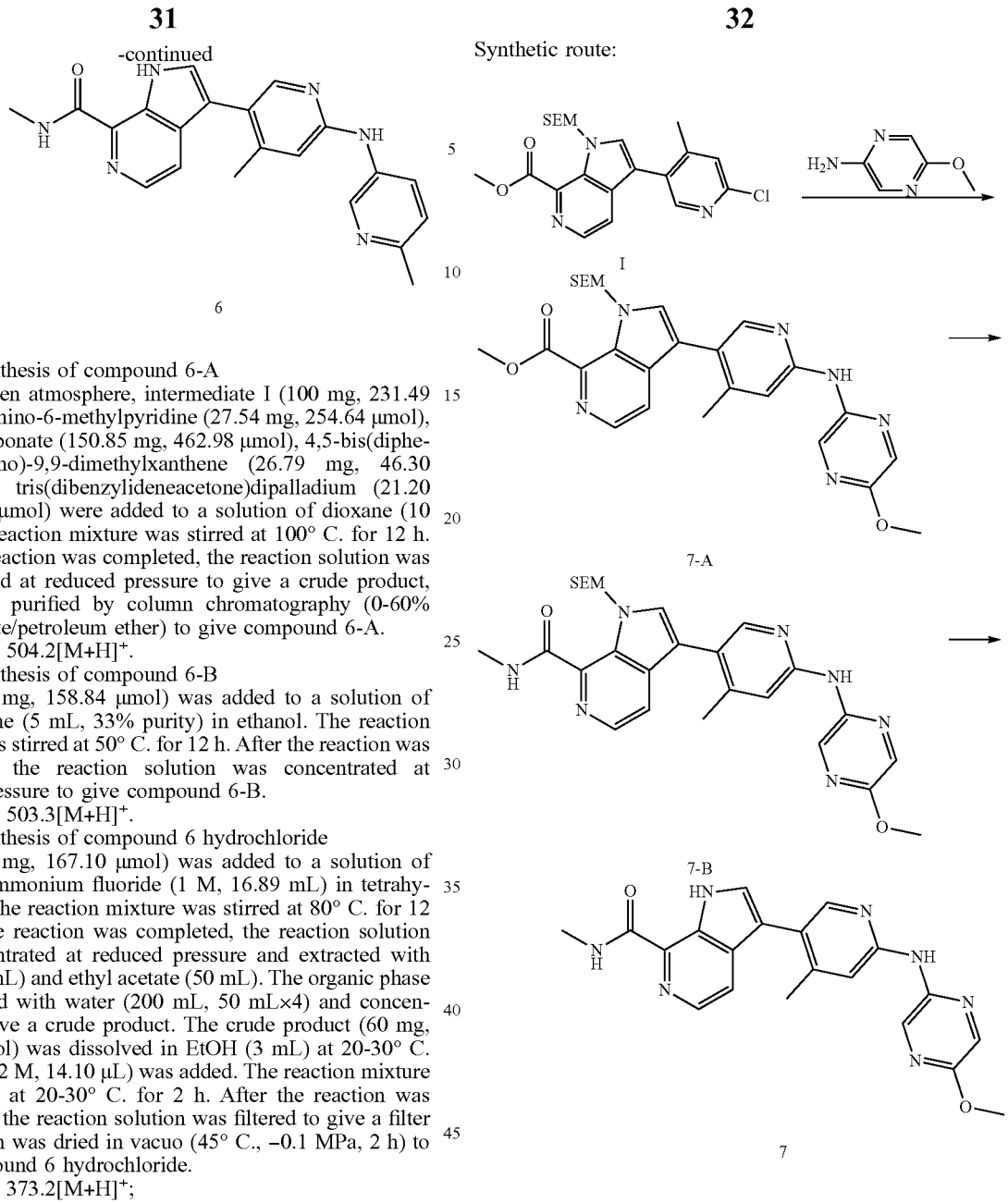

6

Step 1: synthesis of compound 6-A

In nitrogen atmosphere, intermediate I (100 mg, 231.49 µmol), 3-amino-6-methylpyridine (27.54 mg, 254.64 µmol), cesium carbonate (150.85 mg, 462.98 µmol), 4,5-bis(diphenylphosphino)-9,9-dimethylxanthene (26.79 mg, 46.30 µmol) and tris(dibenzylideneacetone)dipalladium (21.20 mg, 23.15 µmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-60% ethyl acetate/petroleum ether) to give compound 6-A.

MS m/z: 504.2[M+H]$^+$.

Step 2: synthesis of compound 6-B

6-A (80 mg, 158.84 µmol) was added to a solution of methylamine (5 mL, 33% purity) in ethanol. The reaction mixture was stirred at 50° C. for 12 h. After the reaction was completed, the reaction solution was concentrated at reduced pressure to give compound 6-B.

MS m/z: 503.3[M+H]$^+$.

Step 3: synthesis of compound 6 hydrochloride

6-B (84 mg, 167.10 µmol) was added to a solution of tetrabutylammonium fluoride (1 M, 16.89 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (60 mg, 161.11 µmol) was dissolved in EtOH (3 mL) at 20-30° C. and HCl (12 M, 14.10 µL) was added. The reaction mixture was stirred at 20-30° C. for 2 h. After the reaction was completed, the reaction solution was filtered to give a filter cake, which was dried in vacuo (45° C., −0.1 MPa, 2 h) to give compound 6 hydrochloride.

MS m/z: 373.2[M+H]$^+$;

$^1$H NMR (400 MHz, CD$_3$OD) δ=9.47 (d, J=2.3 Hz, 1H), 8.47 (dd, J=2.5, 8.8 Hz, 1H), 8.41 (s, 1H), 8.33 (d, J=6.3 Hz, 1H), 8.28 (s, 1H), 8.11 (d, J=6.5 Hz, 1H), 7.88 (d, J=8.8 Hz, 1H), 7.18 (s, 1H), 3.14 (s, 3H), 2.76 (s, 3H), 2.35 (s, 3H).

EXAMPLE 7

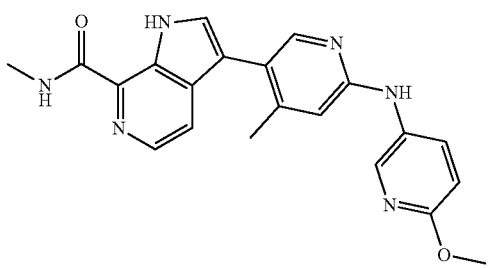

Synthetic route:

Step 1: synthesis of compound 7-A

In nitrogen atmosphere, intermediate I (100 mg, 231.49 µmol), 2-amino-5-methoxypyrazine (28.97 mg, 231.49 µmol), cesium carbonate (150.85 mg, 462.98 µmol), 4,5-bis(diphenylphosphino)-9,9-dimethylxanthene (26.79 mg, 46.30 µmol) and tris(dibenzylideneacetone)dipalladium (21.20 mg, 23.15 µmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-50% THF/DCM) to give compound 7-A.

MS m/z: 521.2[M+H]$^+$.

Step 2: synthesis of compound 7-B

7-A (86 mg, 165.18 µmol) was added to a solution of methylamine (5 mL, 33% purity) in ethanol. The reaction mixture was stirred at 50° C. for 12 h. After the reaction was completed, the reaction solution was concentrated at reduced pressure to give compound 7-B.

MS m/z: 520.3[M+H]$^+$.

Step 3: synthesis of compound 7 hydrochloride

7-B (82 mg, 157.79 μmol) was added to a solution of tetrabutylammonium fluoride (1 M, 15.95 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (70 mg, 179.76 μmol) was dissolved in EtOH (3 mL) at 20-30° C. and HCl (12 M, 15.73 μL) was added. The reaction mixture was stirred at 20-30° C. for 2 h. After the reaction was completed, the reaction solution was filtered to give a filter cake, which was dried in vacuo (45° C., −0.1 MPa, 2 h) to give compound 7 hydrochloride.

MS m/z: 390.2[M+H]$^+$;

$^1$H NMR (400 MHz, CD$_3$OD) δ=8.42 (s, 1H), 8.36 (d, J=6.3 Hz, 1H), 8.24 (d, J=4.6 Hz, 2H), 8.14 (s, 1H), 8.12 (d, J=5.9 Hz, 1H), 7.42 (s, 1H), 4.02 (s, 3H), 3.13 (s, 3H), 2.46 (s, 3H).

EXAMPLE 8

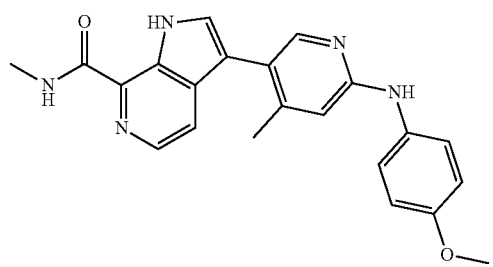

Synthetic route:

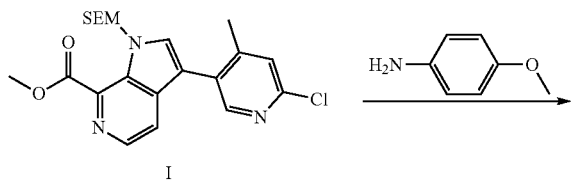

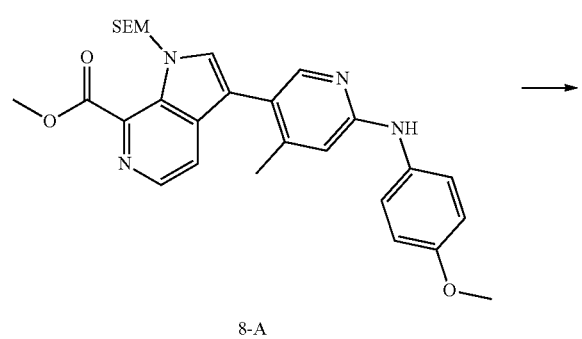

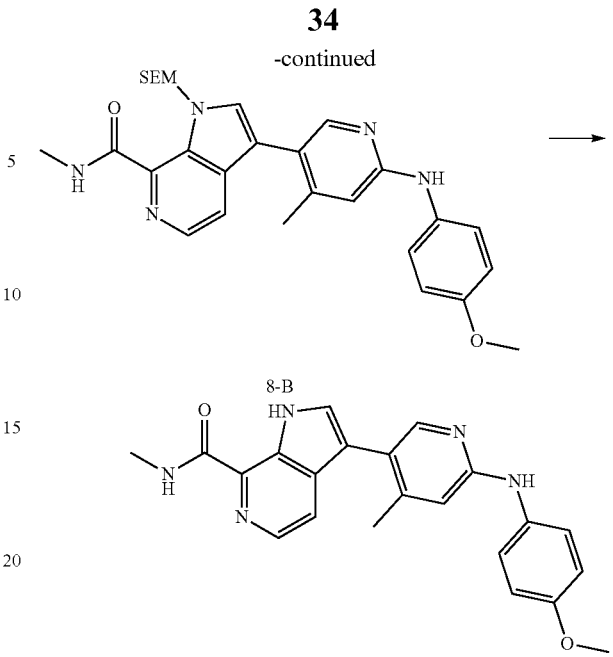

Step 1: synthesis of compound 8-A

Intermediate I (100 mg, 231.49 μmol), p-methoxyaniline (31.36 mg, 254.64 μmol), cesium carbonate (150.85 mg, 462.98 μmol), 4,5-bis(diphenylphosphino)-9,9-dimethylxanthene (26.79 mg, 46.30 μmol) and tris(dibenzylideneacetone)dipalladium (21.20 mg, 23.15 μmol) were added to a solution of dioxane (10 mL). The mixture was stirred at 100° C. for 12 h in nitrogen atmosphere. After the reaction was completed, the reaction solution was concentrated to give a crude product, which was purified by column chromatography (0-50% ethyl acetate/petroleum ether) to give compound 8-A.

MS m/z: 519.3[M+H]$^+$.

Step 2: synthesis of compound 8-B

Compound 8-A (75 mg, 144.60 μmol, 1 eq) was dissolved in ethanol (5 mL), and a solution of methylamine in ethanol (3.5 g, 37.19 mmol, 5 mL, 33% purity) was added. The reaction solution was stirred in an oil bath at 45-50° C. for 16 h. The reaction solution was concentrated at reduced pressure to remove the solvent, and compound 8-B was obtained.

MS m/z: 518.2[M+H]$^+$.

Step 3: synthesis of compound 8 hydrochloride

Compound 8-B (83 mg, 160.33 μmol) was dissolved in tetrahydrofuran (5 mL), and anhydrous ethylenediamine (144.53 mg, 2.40 mmol, 160.95 μL) and tetrabutylammonium fluoride (1 M tetrahydrofuran solution, 801.63 μL) were added. The reaction solution was stirred in an oil bath at an external temperature of 85-90° C. for 16 h. After the reaction was completed, the reaction solution was concentrated at reduced pressure to remove the solvent, and a crude product was obtained. The obtained residue was purified by preparative HPLC (column: Phenomenex Synergi C18 (150×30 mm×4 μm); mobile phase: [0.05% aqueous hydrochloric acid-acetonitrile]; gradient: 12%-42%) to give compound 8 hydrochloride.

MS m/z: 388.3[M+H]$^+$;

¹H NMR (400 MHz, CD₃OD) δ=8.36 (br d, J=10.0 Hz, 2H), 8.11 (br s, 1H), 7.85 (s, 1H), 7.39 (br d, J=8.0 Hz, 2H), 7.17 (s, 1H), 7.13 (br d, J=7.8 Hz, 2H), 3.87 (s, 3H), 3.12 (s, 3H), 2.35 (s, 3H).

EXAMPLE 9

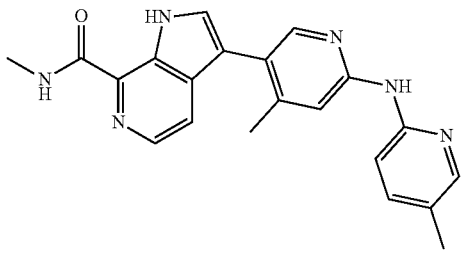 [SMILES: CNC(=O)c1nccc2c(-c3cnc(Nc4ccc(C)cn4)cc3C)c[nH]c12]

Synthetic route:

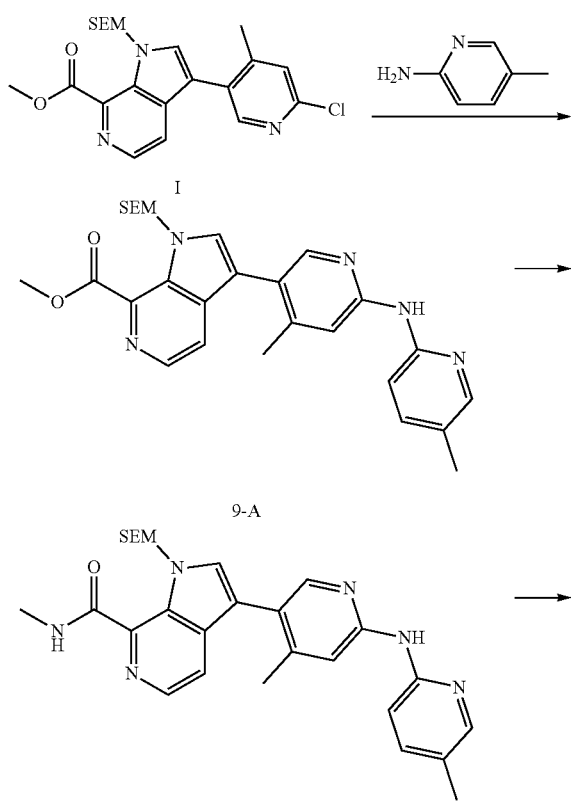

Step 1: synthesis of compound 9-A

Intermediate I (100 mg, 231.49 μmol), 2-amino-5-methylpyridine (27.54 mg, 254.64 μmol), cesium carbonate (98.28 mg, 301.63 μmol), 4,5-bis(diphenylphosphino)-9,9-dimethylxanthene (26.79 mg, 46.30 μmol) and tris(dibenzylideneacetone)dipalladium (21.20 mg, 23.15 μmol) were added to a solution of dioxane (10 mL). The mixture was stirred at 100° C. for 12 h in nitrogen atmosphere. After the reaction was completed, the reaction solution was concentrated to give a crude product, which was purified by column chromatography (0-10% methanol/dichloromethane) to give compound 9-A.

MS m/z: 504.3[M+H]⁺.

Step 2: synthesis of compound 9-B

Compound 9-A (95 mg, 188.62 μmol) was dissolved in ethanol (5 mL), and a solution of methylamine in ethanol (3.5 g, 37.19 mmol, 5 mL, 33% purity) was added. The reaction solution was stirred in an oil bath at 45-50° C. for 16 h. The reaction solution was concentrated at reduced pressure to remove the solvent, and compound 9-B was obtained.

MS m/z: 503.1[M+H]⁺.

Step 3: synthesis of compound 9 hydrochloride

Compound 9-B (97 mg, 192.96 μmol) was dissolved in tetrahydrofuran (5 mL), and anhydrous ethylenediamine (173.95 mg, 2.89 mmol, 193.71 μL) and tetrabutylammonium fluoride (1 M tetrahydrofuran solution, 964.82 μL) were added. The reaction solution was stirred in an oil bath at an external temperature of 85-90° C. for 16 h. After the reaction was completed, the reaction solution was concentrated at reduced pressure to remove the solvent, and a crude product was obtained. The obtained residue was purified by preparative HPLC (column: Phenomenex Synergi C18 (150×30 mm ×4 μm); mobile phase: [0.05% aqueous hydrochloric acid-acetonitrile]; gradient: 26%-56%) to give compound 9 hydrochloride.

MS m/z: 373.2[M+H]⁺;

1H NMR (400 MHz, CD₃OD)=8.48 (s, 1H), 8.43 (br s, 1H), 8.36 (br s, 1H), 8.22 (br s, 1H), 8.16 (br s, 1H), 8.04 (br d, J=8.8 Hz, 1H), 7.35 (br d, J=8.8 Hz, 1H), 7.31 (s, 1H), 3.14 (s, 3H), 2.41 (s, 6H).

EXAMPLE 10

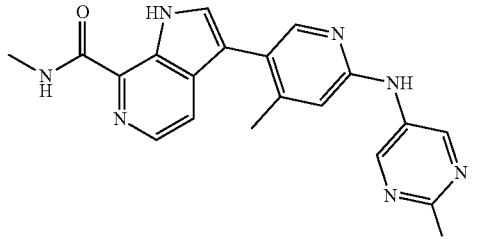

Synthetic route:

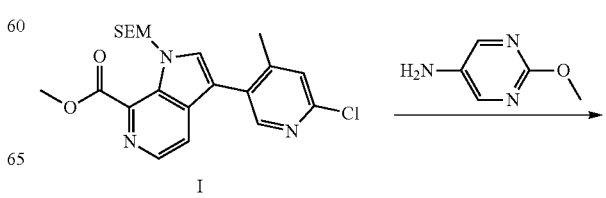

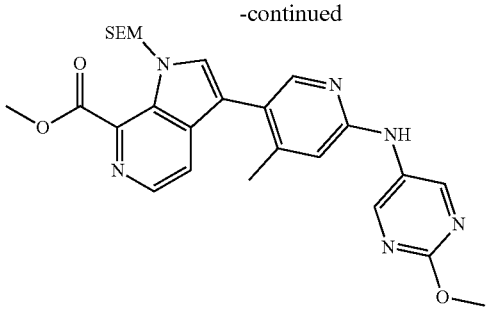

10-A

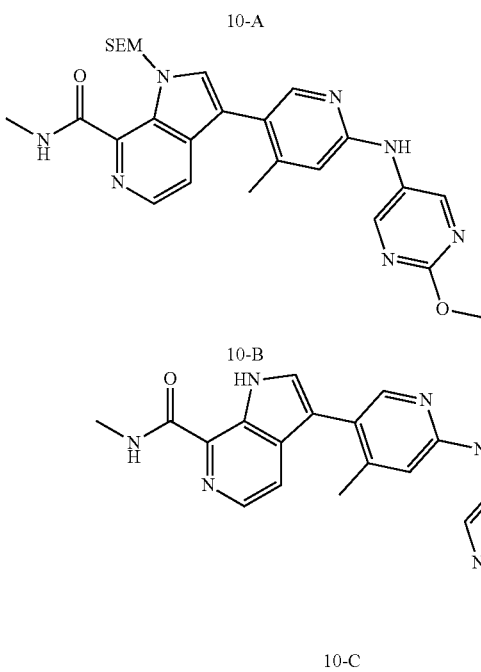

10-B

10-C

Step 1: synthesis of compound 10-A

In nitrogen atmosphere, intermediate I (100 mg, 231.49 µmol), 2-methoxy-5-aminopyrimidine (31.86 mg, 254.64 µmol), cesium carbonate (98.28 mg, 301.63 µmol), 4,5-bis (diphenylphosphino)-9,9-dimethylxanthene (26.79 mg, 46.30 µmol) and tris(dibenzylideneacetone)dipalladium (21.20 mg, 23.15 µmol) were added to a solution of dioxane (10 mL). The reaction mixture was stirred at 100° C. for 12 h. After the reaction was completed, the reaction solution was concentrated at reduced pressure to give a crude product, which was purified by column chromatography (0-50% tetrahydrofuran/petroleum ether) to give compound 10-A.

MS m/z: 521.2[M+H]$^+$.

Step 2: synthesis of compound 10-B

10-A (90 mg, 172.86 µmol) was added to a solution of methylamine (5 mL, 33% purity) in ethanol. The reaction mixture was stirred at 50° C. for 2 h. After the reaction was completed, the reaction solution was concentrated at reduced pressure to give compound 10-B.

MS m/z: 520.3[M+H]$^+$.

Step 3: synthesis of compound 10 hydrochloride

10-B (120 mg, 230.92 µmol) was added to a solution of tetrabutylammonium fluoride (1 M, 10 mL) in tetrahydrofuran. The reaction mixture was stirred at 80° C. for 12 h. After the reaction was completed, the reaction solution was concentrated at reduced pressure and extracted with water (50 mL) and ethyl acetate (50 mL). The organic phase was washed with water (200 mL, 50 mL×4) and concentrated to give a crude product. The crude product (90 mg, 231.12 µmol) was dissolved in EtOH (3 mL) at 10-20° C. and HCl (12 M, 20.22 µL) was added. The reaction mixture was stirred at 40° C. for 12 h. After the reaction was completed, the reaction solution was filtered to give a filter cake, which was dried in vacuo (45° C., −0.1 MPa, 2 h) to give compound 10.

MS m/z: 390.1[M+H]$^+$;

$^1$H NMR (400 MHz, CD$_3$OD) δ=8.78 (s, 2 H), 8.35 (d, J=5.75 Hz, 1 H), 8.12 (s, 1 H), 7.99 (s, 1 H), 7.88 (d, J=5.75 Hz, 1 H), 7.25 (s, 1 H), 4.09 (s, 3 H), 3.07 (s, 3 H), 2.39 (s, 3 H).

Experimental Example 1: In vitro enzymatic inhibitory activity of the compounds of the present disclosure Reagents:

Basic reaction buffer: 20 mM hydroxyethylpiperazine ethane sulfonic acid (pH 7.5), 10 mM magnesium chloride, 1 mM EGTA, 0.02% Brij35, 0.02 mg/mL bovine serum albumin, 0.1 mM Na$_3$VO$_4$, 2 mM DTT, 1% DMSO Necessary cofactors were separately added to the CSF-1R kinase reaction.

Enzyme: CSF-1R, 2.5 nM

Treatment:

The test compounds were prepared into solutions of specified concentrations in 100% DMSO, and the solutions were serially diluted in DMSO using the Integra Viaflo Assist.

Procedures:

1. A fresh medium preparation reaction buffer was prepared;
2. All necessary cofactors were added to the reaction buffer described above;
3. The kinase was added into the medium solution and the mixture was shaked gently;
4. Solutions of the compounds in DMSO were added to the kinase reaction mixture using an acoustic technique (Echo550; in nanoliter range), and the system was incubated at room temperature for 20 min;
5. $^{33}$P-ATP (specific activity: 10 µCi/µL) was added to the reaction mixture to initiate the reaction;
6. The mixture was incubated for 2 h at room temperature;
7. The kinase activity was detected by a filter-binding method;
8. The kinase activity IC$_{50}$ values and the curves were obtained by comparison with the other kinases and the vehicle (DMSO) group using Prism (GraphPad software). The results are shown in Table 1.

TABLE 1

Results of in vitro enzymatic activity assay of the compounds of the present disclosure (IC$_{50}$)

| Compound No. | CSF-1R (IC$_{50}$ nM) | Compound No. | CSF-1R (IC$_{50}$ nM) |
|---|---|---|---|
| Compound 1 hydrochloride | 1.13 | Compound 2 hydrochloride | 26.8 |
| Compound 3 hydrochloride | 34 | Compound 6 hydrochloride | 30 |
| Compound 7 hydrochloride | 26 | Compound 8 hydrochloride | 10 |

Conclusion: The compound of the present disclosure has significant inhibitory effect on CSF-1R kinase.

Experimental Example 2: Permeability Study (MDR1-MDCK)

Objective:
The bi-directional permeabilities of the test compounds were determined using a Caco-2 monolayer cell model.

Procedures:
Caco-2 cells were seeded on a Transwell-96 well plate at a density of $1\times10^5$ cells/cm$_2$. The cells were cultured in a carbon dioxide incubator for 28 days before being used in a transport assay, during which the medium was changed every four to five days.

The buffer was Hank's balanced salt buffer containing 10 mM HEPES (pH 7.40±0.05). The test compounds were diluted to 2 µM with the buffer. The medium was removed from the plate and the cells were rinsed twice with pre-warmed transport buffer. The treatment solutions and the buffer were added to the corresponding cell plate well (75 and 250 µL of samples were loaded to apical and basolateral wells, respectively, n=2), The bi-directional transport assay was started. After loading, the cell plates were incubated at 37±1° C. at 5% $CO_2$ and saturated humidity for 120 min.

The initial treatment solution was the To sample. After loading, the sample was mixed with a transport buffer (Hank's balanced salt buffer) and a terminating solution (a 250 ng/mL solution of tolbutamide in acetonitrile) in a certain ratio. After 120 min of incubation, final samples were collected from the dosing and receiving ends, and mixed with the transport buffer and terminating solution in a certain ratio.

All samples were vortexed and centrifuged at 4000 rpm at 20° C. for 20 min. The supernatant was diluted with ultra-pure water in a 1:1 (v:v) ratio and stored at 2-8° C. for analysis using liquid chromatography-mass spectrometer (LC/MS/MS).

The integrity of the Caco-2 cell layer was tested by the lucifer yellow rejection assay. 6 wells were randomly selected from each cell plate. 75 µL of 100 µM lucifer yellow was added into the apical end, and 250 µL of transport buffer was added to the basolateral end. After 120 min of incubation, a sample of 20 µL was collected at the apical end and mixed with a 60-µL transport buffer, and a sample of 80 µL was collected at the basolateral end. The relative fluorescence unit (RFU) of the lucifer yellow in the samples was measured at 425/528 nm (excitation/emission wavelength) using an M2e plate reader.

Data processing:
The apparent permeability coefficient ($P_{app}$, cm/s), the efflux ratio (ER) and the percentage solution recovery were calculated using the following formulas.

$$P_{app} = \frac{V_R}{\text{Area} \times \text{Time}} \times \frac{[\text{drug}]_{receiver}}{[\text{drug}]_{initial,donor}} = \frac{V_R}{\text{Area} \times \text{Time}} \times \frac{C_R}{C_0}$$

$$ER = \frac{P_{app}(B-A)}{P_{app}(A-B)}$$

$$\% \text{ Solution Recovery} = \frac{C_R \times V_R + C_D \times V_D}{C_0 \times V_D} \times 100$$

$V_R$ is the volume of the solution collected at the receiving end (0.075 mL for side A and 0.25 mL for side B); Area is the relative surface area of the cell monolayer (0.0804 cm$^2$); Time is the incubation time (7200 s); $C_0$ is the peak area proportion of the test compound at the dosing end; $V_D$ is the volume of the dosing end (0.075 mL for side A and 0.25 mL for side B); $C_D$ and $C_R$ are the peak area proportions of the test compound at the dosing end and the receiving end, respectively.

The percentage transmittance of the lucifer yellow to the basolateral end was calculated using the following formula:

$$\% \text{ Lucifer Yellow} = \frac{V_{Basolateral} \times RFU_{Basolateral}}{V_{Apical} \times RFU_{Apical} + V_{Basolateral} \times RFU_{Basolateral}} \times 100$$

$RFU_{Apical}$ and $RFU_{Basolateral}$ are the relative fluorescence intensities of the lucifer yellow at the apical and basolateral ends, respectively. $V_{Apical}$ and $V_{Basolateral}$ are the loading volumes at the apical and basal ends, respectively (0.075 mL and 0.25 mL, respectively).

|  | Species | PLX-3397 | Compound 1 hydrochloride |
|---|---|---|---|
| Permeability | MDR1: A to B/B to A/ER | 0.74/0.55/0.75 | 14.53/7.08/0.49 |

Conclusion: The permeability of compound 1 hydrochloride is higher than that of PLX-3397.

Experimental Example 3: Cytochrome Enzyme Inhibition Study (CYP Inhibition)

Objective:
A mixed probe substrate of CYP isoenzymes were used to evaluate the inhibitory effect of test compounds on human liver microsomal cytochrome P450 isoenzymes (CYP1A2, CYP2C9, CYP2C19, CYP2D6 and CYP3A4).

Procedures:
The test compounds were prepared into 10 mM stock solutions with DMSO. A 178 µL solution of human liver microsome and substrate mixture was added to the non-inhibitor control (NIC) and test compound wells of the reaction plate and the reaction was then placed on ice. 2 µL of blank solvent and test compound working solution were taken from the dilution plate, and added to the reaction plate (at final concentrations of 0.05-50 µM). The reaction plate was prewarmed in a 37±0.2° C. water bath for 10 min. 20 µL of the cofactor solution was taken by a liquid treatment workstation and added into the reaction plate to initiate the reaction.

After 10 min, 400 µL of terminating solution was added to the reaction plate to terminate the reaction, and the reaction plate was incubated on ice for 5 min. The plate was shaken for 10 min to homogenize the solutions, and the solutions were centrifuged at 4000 rpm for 20 min. The supernatant was then removed and ultrapure water was added in an appropriate ratio. The peak areas of the substrate and the product were detected by liquid chromatography-mass spectrometer (LC/MS/MS). The samples were stored at 2-8° C. before detection.

The peak area ratio of the metabolite generated by the probe substrate to the internal standard was determined by liquid chromatography-mass spectrometer (LC-MS/MS). The retention times of the analyte and internal standard, the chromatogram acquisitions and the integrals of the chromatograms were processed with software Analyst (AB Sciex, Framingham, Massachusetts, USA).

Data processing:

Non-linear regression analysis of the mean percentage activity versus concentration of the test compounds was performed using SigmaPlot (V.11). $IC_{50}$ values were calculated by a three-parameter or four-parameter sigmoidal logarithmic equation. When the CYP percentage activity was greater than 50% at the highest concentration (50 μM) of the test compound, the $IC_{50}$ value was labeled as ">50 μM".

Three-parameter sigmoidal logarithmic equation:

$$y = \frac{max}{1 + \left(\frac{x}{IC_{50}}\right)^{-hillslope}}$$

Four-parameter sigmoidal logarithmic equation:

$$y = min + \frac{max - min}{1 + \left(\frac{x}{IC_{50}}\right)^{-hillslope}}$$

max: the maximum enzyme activity.
min: the minimum enzyme activity.
x: the concentration of the test compound or the positive control inhibitor.
y: the enzyme activity at the corresponding concentration; hillslope: the slope.
$IC_{50}$: half maximal inhibitory concentration.

The four-parameter sigmoidal logarithmic equation was used when the minimum enzyme activity was within ±10%, or otherwise the three-parameter equation was used.

| Test compound | PLX-3397 | Compound 1 hydrochloride |
|---|---|---|
| CYP inhibition ($IC_{50}$, μM) 1A2/2C9/2C19/2D6/3A4 ($IC_{50}$, μM) | 24.0/3.81/8.32/ 8.77/>35.6 | >50/11.6/ 21.0/>50/28.0 |

Conclusion: The compound of the present disclosure has weak inhibitory effect on the five CYP isoenzymes and thus reduced risk for use in combination therapy.

Experimental Example 4: Pharmacokinetic Study (PK)

Objective:

This study was intended to explore the pharmacokinetics of the test compound in the plasma of male C57BL/6J mice and SD rats after intravenous and oral administrations.

Procedures:

The animals were randomized into two groups of 3 male animals. The compounds were formulated as designated (vehicle: 0.5% MC), i.e., clear solutions for intravenous injection and clear or homogeneous suspensions for oral formulations.

Animal whole blood samples were collected by jugular vein puncture or from saphenous vein at 5 min, 15 min and 30 min and 1 h, 2 h, 4 h, 6 h and 8 h post-dose. The whole blood samples were added to centrifuge tubes containing anticoagulant and centrifuged at 4° C., 3000 g for 15 min. The plasma supernatant was taken and quickly frozen on dry ice and stored in a freezer at −70±10° C. before LC-MS/MS analysis.

Data processing:

Plasma drug concentration data for compounds were processed in a non-compartmental model using WinNonlin™ Version 6.3.0 (Pharsight, Mountain View, CA) pharmacokinetic software. Peak concentration ($C_{max}$) and time to peak ($T_{max}$) and time of the last quantifiable concentration were directly obtained from the plasma concentration-time curve.

The following pharmacokinetic parameters were calculated using the log-linear trapezoidal method: plasma clearance (CL), volume of distribution (Vd), elimination phase half-life ($T_{1/2}$), mean retention time of the compound from point 0 to the last time point ($MRT_{0-last}$), mean retention time of the compound from point 0 to infinite ($MRT_{0-inf}$), area under the time-plasma concentration curve from point 0 to the last time point ($AUC_{0-last}$), area under the time-plasma concentration curve from point 0 to infinite ($AUC_{0-inf}$) and bioavailability (F).

Results:

| | | Mouse | | Rat | |
|---|---|---|---|---|---|
| | | PLX-3397 | Compound 1 hydrochloride | PLX-3397 | Compound 1 hydrochloride |
| PK IV | Dose (mpk) | 1 | 1 | 1 | 1 |
| | $T_{1/2}$ (h): | 3.33 | 8.62 | 1.27 | 3.4 |
| | Cl (mL/Kg/min) | 0.927 | 0.2 | 4.64 | 0.61 |
| | Vd (L/kg) | 0.265 | 0.15 | 0.613 | 0.2 |
| | $AUC_{0-last}$(nM · h) | 28962 | 168384 | 8492 | 65993 |
| PO | Dose (mpk) | 10 | 10 | 10 | 3 |
| | Cmax (nM) | 17200 | 116798 | 10700 | 27409 |
| | Tmax (h) | 4.0 | 3.0 | 1.5 | 2.0 |
| | $AUC_{0-last}$(nM · h) | 130992 | 1651475 | 70249 | 249032 |
| | F (%) | 74.1 | 98 | 81.0 | 129 |

Conclusion: The compound of the present disclosure can significantly improve pharmacokinetics such as half-life, exposure and the like.

Experimental Example 5: In vivo Pharmacodynamic Study of Compound 1 Hydrochloride in Ba/F3-TEL-CSF1R Cell in Situ Graft Tumor nu/nu Nude Mouse Model Objective The in vivo efficacy of compound 1 hydrochloride on Ba/F3-TEL-CSF1R cell in situ graft tumor model was evaluated.

Design

Cell culture: Ba/F3-TEL-CSF1R cells were cultured in 1640 medium (Biological Industries)+10% fetal bovine serum (BI)+1% dual antibiotic solution (Penicilin Streptomycin Solution, Coring, USA) at 37° C. at 5% $CO_2$ and passaged twice a week. When the saturation reached 80%-90% and met the requirement, the cells were collected, counted and grafted.

Animals: 28 nu/nu mice, female, aged 6-8 weeks, 18-22 g, supplied by Beijing Vital River Laboratory Animal Technology Co., Ltd.

Tumor grafting: 0.2 mL of Ba/F3-TEL-CSF1R cell suspension (2×106 cells) was grafted into each mouse through tail vein injection, and the mice were randomized by weight on day 10.

Grouping and dosing regimens

| Group | Number of animals | Treatment | Dose (mg/kg) | Dosing volume (μL/g) | Route of administration | Frequency of administration |
|---|---|---|---|---|---|---|
| G0 | 3 | Naive group | — | — | — | — |
| G1 | 6 | Vehicle group | — | 10 | p.o | QD |
| G2 | 6 | Control group (PLX-3397) | 10 | 10 | p.o | QD |
| G3 | 6 | Compound 1 hydrochloride | 1 | 10 | p.o | QD |
| G4 | 6 | Compound 1 hydrochloride | 3 | 10 | p.o | QD |
| G5 | 6 | Compound 1 hydrochloride | 10 | 10 | p.o | QD |

Accommodation: The animals were isolated for quarantine and acclimation for 7 days in the experimental environment.

The animals were housed in SPF animal rooms in independent cages with air supply, and each cage contained no more than 5 animals.
➢ Temperature: 20-26° C.
➢ Humidity: 35%-75%
➢ Illumination: 12 h/12 h light/darkness cycle
➢ Corn core padding, changed once a week
➢ Diet: free access to dry pellet feed sterilized by irradiation.
➢ Drinking water: free access drinking water sterilized by acidification.
➢ Labeling: ear cutting.

Grouping: The subcutaneous tumor-bearing state was observed every day after grafting; the body weight and tumor volume were measured before grouping, and the mice were randomized according to the data.

Observation: The drafting and any modification of the protocol were approved by the Ethics Committee of Laboratory Animal Welfare of Precision Preceding Do Co., Ltd. (Hefei, China). Animals were monitored daily for health and mortality, including, for example, tumor growth, mobility, diet, weight, eye, hair and other abnormal behaviors, appearance, signs or other abnormalities. The numbers of deaths and adverse events in the groups were recorded based on the number of animals.

Parameters: The body weights were measured and animal survival rate observed daily; at the end of the study (4 h after the last dose), the mice were euthanized and the spleen and liver were collected, weighed and photographed.

The results are shown in the FIGURE.

Conclusion: In the TEL-CSF1R-BaF3 cell splenomegaly assay, compound 1 hydrochloride showed significant advantage at 10 mpk. The high, medium and low doses showed clear dose-dependence; the compound showed significant efficacy at 1 mpk, which was comparable to that of PLX-3397, and the statistical significance was superior to that of PLX-3397.

The invention claimed is:

1. A compound of formula (P) or a pharmaceutically acceptable salt thereof,

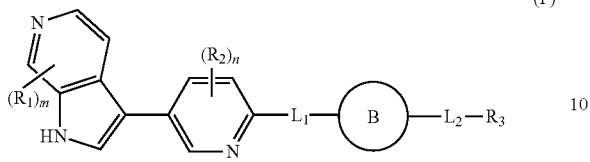

wherein,
- $R_1$ is selected from F, Cl, Br, I, $C_{1-3}$ alkyl, $C_{1-3}$ alkoxy, —C(=O)—$C_{1-3}$ alkyl and —C(=O)—NH—$C_{1-3}$ alkyl, the $C_{1-3}$ alkyl, $C_{1-3}$ alkoxy, —C(=O)—$C_{1-3}$ alkyl and —C(=O)—NH—$C_{1-3}$ alkyl being optionally substituted with 1, 2 or 3 Ra;
- $R_2$ is selected from F, Cl, Br, I and $C_{1-3}$ alkyl, the $C_{1-3}$ alkyl being optionally substituted with 1, 2 or 3 $R_b$;
- $R_3$ is selected from H, $C_{1-3}$ alkyl and $C_{3-5}$ cycloalkyl, the $C_{1-3}$ alkyl and $C_{3-5}$ cycloalkyl being optionally substituted with 1, 2 or 3 $R_c$;
- ring B is selected from phenyl and 6-membered heteroaryl;
- m and n are each independently selected from 0, 1 and 2;
- $L_1$ is selected from —N($R_d$)—;
- $L_2$ is selected from a single bond, —O—, —N($R_d$)—C(=O)— and —N($R_d$)—C($R_e$)($R_f$)—;
- $R_a$, $R_b$ and $R_c$ are each independently selected from F, Cl, Br, I and $CH_3$;
- $R_d$, $R_e$ and $R_f$ are each independently selected from H and $CH_3$.

2. The compound or the pharmaceutically acceptable salt thereof according to claim 1, wherein $R_1$ is selected from F, Cl, Br, I, $CH_3$, $OCH_3$, —C(=O)—$CH_3$ and —C(=O)—NH—$CH_3$, the $CH_3$, $OCH_3$, —C(=O)—$CH_3$ and —C(=O)—NH—$CH_3$ being optionally substituted with 1, 2 or 3 $R_a$.

3. The compound or the pharmaceutically acceptable salt thereof according to claim 2, wherein $R_1$ is selected from F, Cl, Br, I, $CH_3$, $CHF_2$, $CF_3$, $OCH_3$, —C(=O)—$CH_3$ and —C(=O)—NH—$CH_3$.

4. The compound or the pharmaceutically acceptable salt thereof according to claim 1, wherein $R_2$ is selected from F, Cl, Br, I and $CH_3$, the $CH_3$ being optionally substituted with 1, 2 or 3 $R_b$.

5. The compound or the pharmaceutically acceptable salt thereof according to claim 4, wherein $R_2$ is selected from F, Cl, Br, I, $CH_3$, $CH_2F$, $CHF_2$ and $CF_3$.

6. The compound or the pharmaceutically acceptable salt thereof according to claim 1, wherein $R_3$ is selected from H, $CH_3$, $CH(CH_3)_2$ and cyclopropyl, the $CH_3$, $OCH_3$ and cyclopropyl being optionally substituted with 1, 2 or 3 $R_c$.

7. The compound or the pharmaceutically acceptable salt thereof according to claim 6, wherein $R_3$ is selected from H, $CH_3$, $CF_3$, $CH(CH_3)_2$ and cyclopropyl.

8. The compound or the pharmaceutically acceptable salt thereof according to claim 1, wherein $L_1$ is selected from —NH— and —N($CH_3$)—.

9. The compound or the pharmaceutically acceptable salt thereof according to claim 1, wherein $L_2$ is selected from a single bond, —O—, —NH—C(=O)—, —NH—$CH_2$— and —N($CH_3$)—$CH_2$—.

10. The compound or the pharmaceutically acceptable salt thereof according to claim 1, wherein ring B is selected from phenyl, pyridinyl, pyrimidinyl, pyrazinyl and pyridazinyl.

11. The compound or the pharmaceutically acceptable salt thereof according to claim 1, wherein a structural unit

is selected from

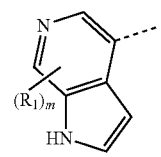

12. The compound or the pharmaceutically acceptable salt thereof according to claim 1, wherein a structural unit is selected from ![](four groups and pyrimidinyl)

13. The compound or the pharmaceutically acceptable salt thereof according to claim 12, wherein the structural unit is selected from

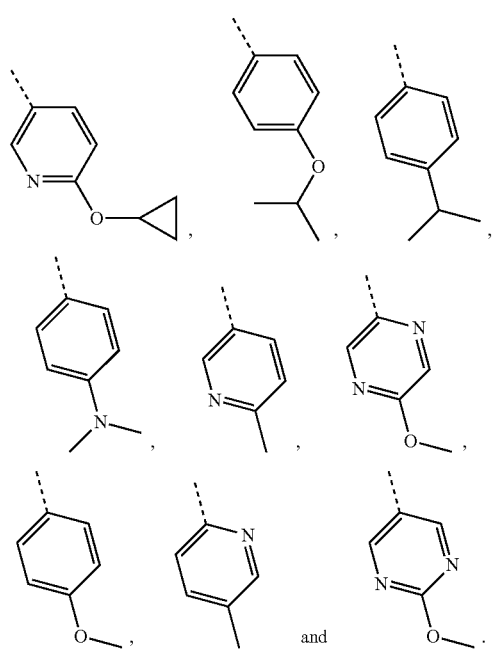

14. The compound or the pharmaceutically acceptable salt thereof according to claim 1, wherein the compound is selected from:

(I-1)
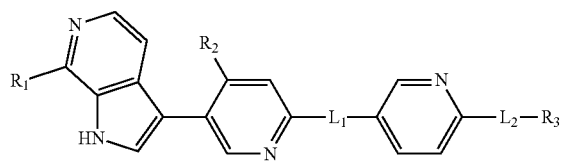

(I-2)
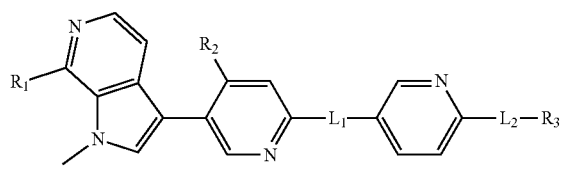

(P-1)
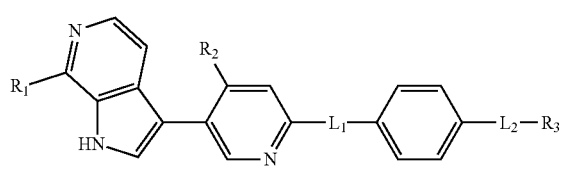

(P-2)
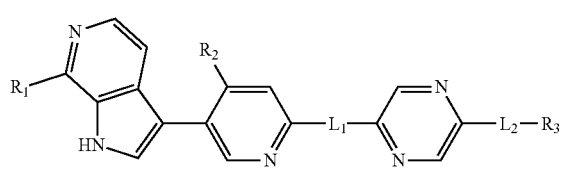

(P-3)
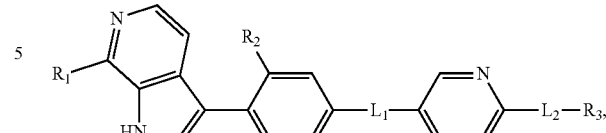

wherein,
$R_1$ is defined according to claim 1;
$R_2$ is defined according to claim 1;
$R_3$ is defined according to claim 1;
$L_1$ is defined according to claim 1;
$L_2$ is defined according to claim 1.

15. The compound or the pharmaceutically acceptable salt thereof according to claim 1, wherein the compound is selected from:

(P-4)
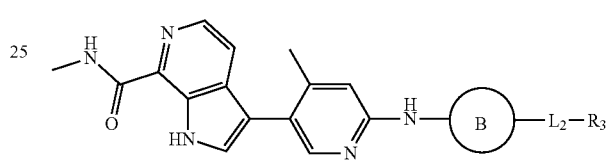

(P-5)
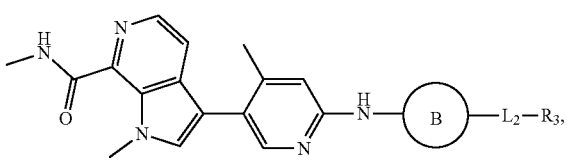

wherein, ring B is selected from

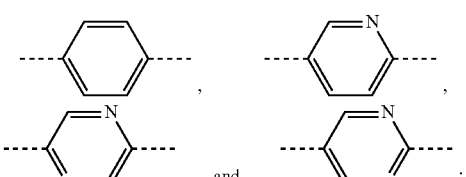

$R_3$ is defined according to claim 1;
$L_2$ is defined according to claim 1.

16. A compound of the formula below or a pharmaceutically acceptable salt thereof,

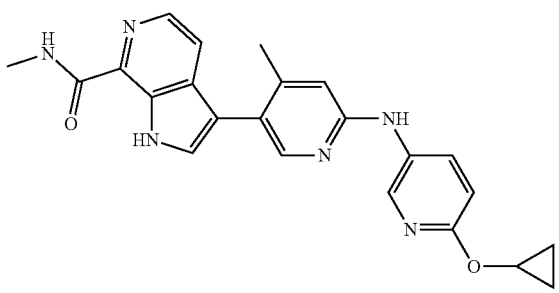

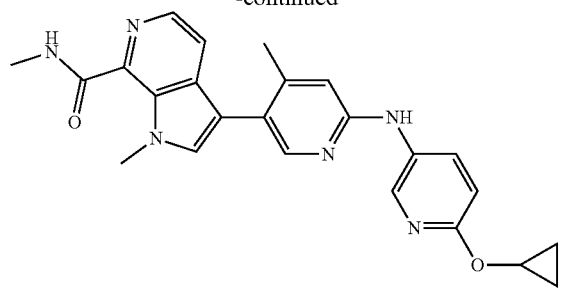
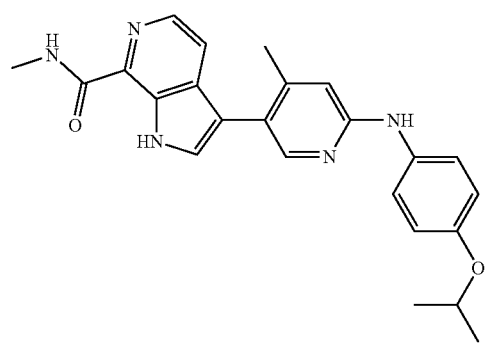
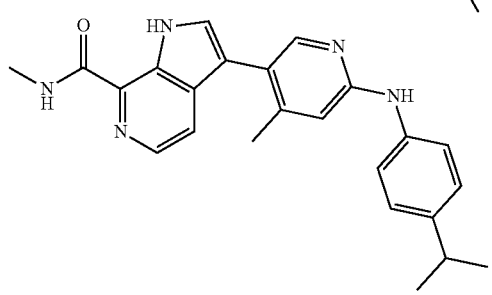
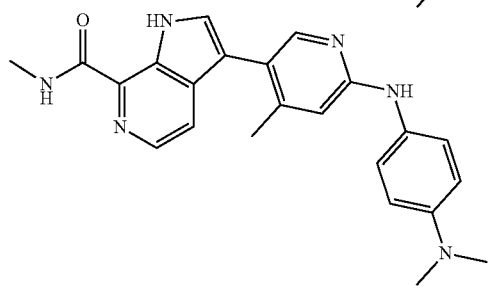
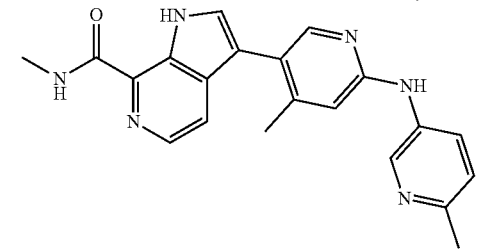
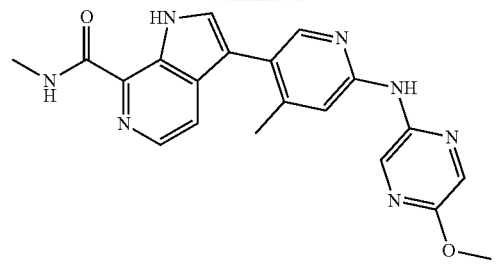
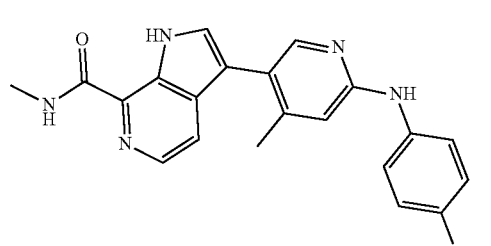
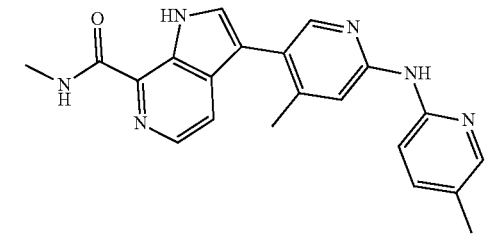
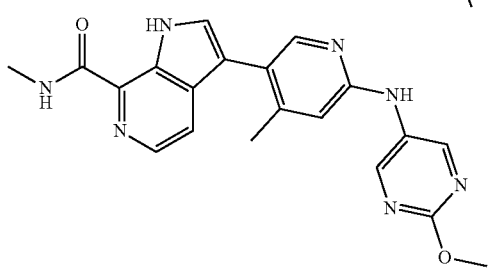
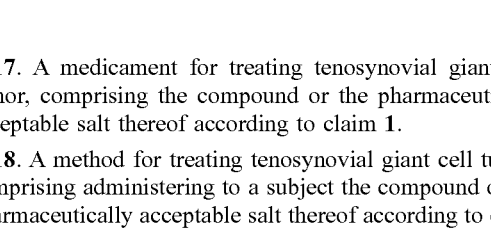
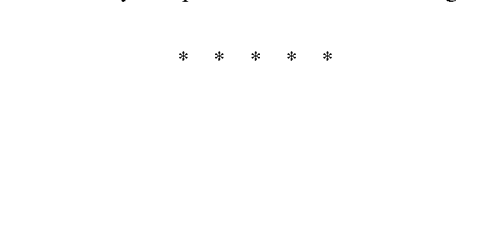
17. A medicament for treating tenosynovial giant cell tumor, comprising the compound or the pharmaceutically acceptable salt thereof according to claim 1.
18. A method for treating tenosynovial giant cell tumor, comprising administering to a subject the compound or the pharmaceutically acceptable salt thereof according to claim 16.
* * * * *